United States Patent
Yiu et al.

(10) Patent No.: US 11,399,321 B2
(45) Date of Patent: Jul. 26, 2022

(54) DEVICES AND METHODS FOR DYNAMIC RACH

(71) Applicant: Apple Inc., Cupertino, CA (US)

(72) Inventors: Candy Yiu, Portland, OR (US); Jing Zhu, Portland, OR (US); Kyeongin Jeong, Youngin-si (KR); Dae Won Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 233 days.

(21) Appl. No.: 16/487,390

(22) PCT Filed: Mar. 15, 2018

(86) PCT No.: PCT/US2018/022705
§ 371 (c)(1),
(2) Date: Aug. 20, 2019

(87) PCT Pub. No.: WO2018/170300
PCT Pub. Date: Sep. 20, 2018

(65) Prior Publication Data
US 2020/0029259 A1   Jan. 23, 2020

Related U.S. Application Data

(60) Provisional application No. 62/473,117, filed on Mar. 17, 2017.

(51) Int. Cl.
*H04W 36/00*   (2009.01)
*H04W 76/27*   (2018.01)
*H04W 74/00*   (2009.01)

(52) U.S. Cl.
CPC ..... *H04W 36/0077* (2013.01); *H04W 74/006* (2013.01); *H04W 74/008* (2013.01); *H04W 76/27* (2018.02)

(58) Field of Classification Search
CPC ........... H04W 36/0077; H04W 74/008; H04W 76/27; H04W 74/006
See application file for complete search history.

(56) References Cited

U.S. PATENT DOCUMENTS

2012/0177006 A1   7/2012   Tsai et al.
2012/0302240 A1*  11/2012  Tamaki ............. H04W 36/0016
                                                              455/436

(Continued)

FOREIGN PATENT DOCUMENTS

KR   1020150103259 A   9/2015
WO      2013096616 A1   6/2013

(Continued)

OTHER PUBLICATIONS

"International Application Serial No. PCT/US2018/022705, International Search Report dated Jun. 27, 2018", 9 pgs.

(Continued)

*Primary Examiner* — Khaled M Kassim
(74) *Attorney, Agent, or Firm* — Kowert, Hood, Munyon, Rankin & Goetzel, P.C.

(57) ABSTRACT

Devices, methods, user equipment (UE), base stations, storage media, and other embodiments are provided for a dynamic random access channel (RACH). In one embodiment, an apparatus includes a memory configured to store a configuration communication from a base station, the configuration communication comprising a dynamic dedicated random access channel (RACH) configuration (RACH-ConfigDedicated) information element, the RACH-ConfigDedicated information element comprising a plurality of dedicated random access parameters. Processing circuitry coupled to the memory is then configured to decode the configuration communication from the base station to identify the plurality of dedicated random access parameters and set up a RACH procedure for connection to the base station (Continued)

using the plurality of dedicated random access parameters. In various embodiments, different communications may be used for the dedicated random access parameters which are used in the RACH procedure.

24 Claims, 14 Drawing Sheets

(56) References Cited

U.S. PATENT DOCUMENTS

| | | | |
|---|---|---|---|
| 2013/0210422 A1* | 8/2013 | Pani | H04W 48/16 |
| | | | 455/423 |
| 2014/0022972 A1* | 1/2014 | Ahn | H04W 36/20 |
| | | | 370/311 |
| 2014/0328309 A1* | 11/2014 | Comstock | H04W 72/082 |
| | | | 370/329 |
| 2015/0105084 A1* | 4/2015 | Bontu | H04W 36/0072 |
| | | | 455/437 |
| 2015/0181623 A1 | 6/2015 | Yi et al. | |
| 2015/0373740 A1* | 12/2015 | Eriksson | H04W 74/0833 |
| | | | 370/329 |
| 2016/0285716 A1* | 9/2016 | Pelletier | H04L 43/0811 |
| 2017/0034866 A1* | 2/2017 | Wager | H04W 76/27 |
| 2017/0078933 A1* | 3/2017 | Li | H04W 36/0077 |
| 2017/0142618 A1* | 5/2017 | Hahn | H04W 36/18 |
| 2017/0295525 A1* | 10/2017 | Rashid | H04W 36/0072 |
| 2018/0227819 A1* | 8/2018 | Lee | H04W 36/0061 |
| 2019/0045419 A1* | 2/2019 | Shrestha | H04W 36/0072 |
| 2019/0124566 A1* | 4/2019 | Liu | H04W 36/0072 |

FOREIGN PATENT DOCUMENTS

| | | |
|---|---|---|
| WO | 2014003436 A1 | 1/2014 |
| WO | WO-2016003044 A1 | 1/2016 |
| WO | WO-2018170300 A1 | 9/2018 |

OTHER PUBLICATIONS

"International Application Serial No. PCT/US2018/022705, Written Opinion dated Jun. 27, 2018", 10 pgs.

Nokia Corporation, Nokia Siemens Networks; "Text Proposal for RRC Connection re-establishment"; 3GPP TSG-RAN WG-2 Meeting #63 r2-084134; Jeju, Korea; Aug. 18, 2008; 8 pages.

Extended European Search Report for Patent Application No. EP 18767760; dated Oct. 16, 2020; 10 pages.

* cited by examiner

200 

205 — DECODE A CONFIGURATION COMMUNICATION FROM A BASE STATION, THE CONFIGURATION COMMUNICATION COMPRISING A DYNAMIC DEDICATED RANDOM ACCESS CHANNEL (RACH) CONFIGURATION (RACH-CONFIGDEDICATED) INFORMATION ELEMENT, THE RACH-CONFIGDEDICATED INFORMATION ELEMENT COMPRISING A PLURALITY OF DEDICATED RANDOM ACCESS PARAMETERS

210 — SET UP A RACH PROCEDURE FOR CONNECTION TO THE BASE STATION USING THE PLURALITY OF DEDICATED RANDOM ACCESS PARAMETERS FROM THE RACH-CONFIGDEDICATED INFORMATION ELEMENT

215 — PERFORM THE RACH PROCEDURE WITH THE BASE STATION USING THE PLURALITY OF DEDICATED RANDOM ACCESS PARAMETERS

405 — DECODE AN RRCCONNECTIONRECONFIGURATION COMMUNICATION FROM A BASE STATION TO IDENTIFY 1) AN INFORMATION ELEMENT INDICATING A HANDOVER OPERATION AND 2) A DYNAMIC DEDICATED RANDOM ACCESS CHANNEL (RACH) CONFIGURATION (RACH-CONFIGDEDICATED) INFORMATION ELEMENT, THE RACH-CONFIGDEDICATED INFORMATION ELEMENT COMPRISING A PLURALITY OF DEDICATED RANDOM ACCESS PARAMETERS

410 — SET UP A HANDOVER OPERATION USING THE PLURALITY OF DEDICATED RANDOM ACCESS PARAMETERS FROM THE RACH-CONFIGDEDICATED INFORMATION ELEMENT

415 — PERFORM THE HANDOVER OPERATION WITH THE BASE STATION USING THE PLURALITY OF DEDICATED RANDOM ACCESS PARAMETERS

DEVICES AND METHODS FOR DYNAMIC RACH

PRIORITY CLAIM

This application is a U.S. National Stage Filing under 35 U.S.C. 371 from International Application No. PCT/US2018/022705, filed Mar. 15, 2018 and published in English as WO 2018/170300 on Sep. 20, 2018, which claims the benefit of priority to U.S. Provisional Patent Application Ser. No. 62/473,117, filed Mar. 17, 2017, and titled "DYNAMIC RANDOM ACCESS CHANNEL (RACH) FOR HANDOVER (HO)," each of which is incorporated herein by reference in its entirety.

TECHNICAL FIELD

Embodiments pertain to systems, methods, and component devices for wireless communications, and particularly to device access and associated operations in Third Generation Partnership Project (3GPP) communication systems.

BACKGROUND

Long-term evolution (LTE) and LTE-Advanced are standards for wireless communication information (e.g., voice and other data) for user equipment (UE) such as mobile telephones. Such systems operate with UEs communicating with a network via cells of radio access technology (RAT) systems which may include an evolved node B (eNB) or other base station systems for providing an initial wireless connection to the larger system. As part of an initial establishing of a connection between a UE and the network, or of passing a connection to a UE between different base stations of a network, random access channel operations are used.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 2 describes a method for dynamic random access channel (RACH) operation in accordance with some embodiments.

FIG. 4 describes a method for dynamic random access channel (RACH) operation in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
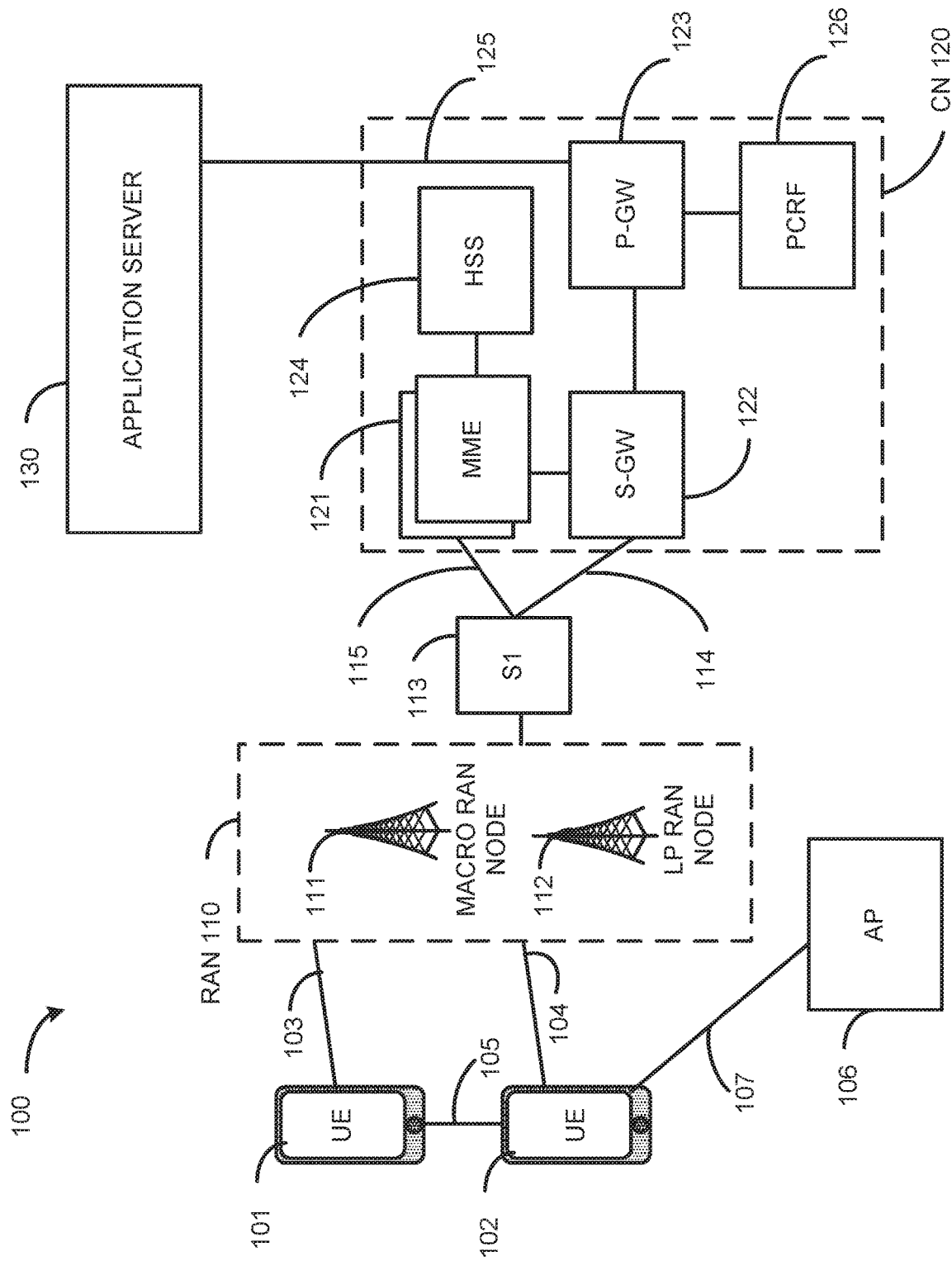
FIG. 1 is a diagram of a wireless network, in accordance with sonic embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSDCH), a Physical Sidelink Discovery Channel (PSDCH), and a Physical Sidelink Broadcast Channel (PSBCH).

The UE 102 is shown to be configured to access an access point (AP) 106 via a connection 107. The connection 107 can comprise a local wireless connection, such as a connection consistent with any IEEE 802.11 protocol, wherein the AP 106 would comprise a WiFi® router. In this example, the AP 106 may be, for example, connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., a macro RAN node 111, and one or more RAN nodes for providing femtocells or picocel s (e.g., cells having smaller coverage areas, smaller user capacity, or higher bandwidth compared to macrocells), e.g., a low-power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance with various communication techniques, such as, but not limited to, an Orthogonal Frequency-Division Multiple Access (OFDMA) communication technique (e.g., for downlink communications) or a Single-Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH, among other things. It may also inform the UEs 101 and 102 about the transport format, resource allocation, and Hybrid Automatic Repeat Request (H-ARQ) information related to the uplink shared channel. Typically, downlink scheduling (e.g., assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LIE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Like the CCEs described above, each ECCE may correspond to nine sets of four physical resource elements known as enhanced resource element groups (EREGs). An ECCE may have other numbers of EREGs in some situations.

The RAN 110 is shown to be communicatively coupled to a core network (CN) 120 via an S1 interface 113. In some embodiments, the CN 120 may be an evolved packet core (EPC) network, a NextGen Packet Core (NPC) network, or some other type of CN. In this embodiment, the S1 interface 113 is split into two parts: an S1-U interface 114, which carries traffic data between the RAN nodes 111 and 112 and a serving gateway (S-GW) 122, and an S1-mobility management entity (MME) interface 115, which is a signaling interface between the RAN nodes 111 and 112 and MMEs 121.

In this embodiment, the CN 120 comprises the MMEs 121, the S-GW 122, a Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network and external networks such as a network including an application server 130 (alternatively referred to as an application function (AF)) via an Internet Protocol (IP) communications interface 125. Generally, the application server 130 may be an element offering applications that use IP bearer resources with the core network (e.g., UMTS Packet Services (PS) domain, LTE PS data services. etc.). In this embodiment, the P-GW 123 is shown to be communicatively coupled to the application server 130 via the IP communications interface 125. The application server 130 can also be configured to support one or more communication services (e.g., Voice over Internet Protocol (VoIP) sessions, PTT sessions, group communication sessions, social networking services, etc.) for the UEs 101 and 102 via the CN 120.

The P-GW 123 may further be a node for policy enforcement and charging data collection. A Policy and Charging Rules Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class identifier (QCI), which commences the QoS and charging as specified by the application server 130.

In a new radio (NR) system, at least in a high frequency, beamforming is expected to compensate for a high propagation loss. However, one of the drawbacks of beamforming is that the coverage area is reduced, creating a greater challenge in handover in NR. At the same time, NR has higher expected operational performance for handover in terms of interruption time. In some embodiments, close to 0 ms interruption for single connected handover and 0 ms interruption for multi-connected handover is anticipated as part of system operation.

In order to achieve such expected operation, the handover procedures consuming the longest interruption time are modified to reduce interruption time. In legacy 3GPP handover, interruption starts when the source cell sends the RRCConnectionReconfiguration (HO command) message to the UE, and lasts until the UE successfully sends an RRCConnectionReconfigurationComplete message to the target cell. During this time, the longest procedure is the random access procedure for the UE to access the target cell. Make-before-break is introduced to reduce the interruption time by allowing the source cell to continue to send and receive data to and from the UE, and a RACH-less procedure is introduced to bypass the RACH procedure. However, RACH-less operation can only be used in intra-eNB cases and with small cells. Make-before-break can indeed help to reduce the interruption time; however, for single connected handover, the UE stops data communications with a source before re-tuning and then the UE performs a RACH operation to the target, which yields a very long interruption time in the context of the specified operations. Especially in NR, where a beam sweep may be used during RACH procedures, the entire RACH operation may contain the wait time for RACH occasions and beam sweeps for RACH.

Embodiments herein relate to how dynamic RACH can be configured at the UE for handover purposes at least for the single connected case.

The idea of dynamic RACH is to allow the network to allocate RACH resources in addition to the fixed preallocated RACH occasion. In general, the UE, when it receives an RRCConnectionReconfiguration message with a MobilityControlInfo (HO command) information element containing a dynamic RACH configuration, operates to speed up and perform RACH using the additional RACH resources in addition to the regular RACH resources. In different embodiments described below, different ways are used to signal to the UE regarding the dynamic RACH resources.

In order to achieve dynamic RACH, in some embodiments one or more of the following two mechanisms may be used. In a first embodiment, separate RACH configurations (e.g., time and frequency RACH resource information, beam index information, preamble code set information, etc.) are signaled via the system information or dedicated signaling for the network-initiated dynamic random access case and for other cases. If the network signals initiation of dynamic random access to the UE, the UE performs random access by using the first (dynamic RACH) RACH configuration. In some embodiments, the network can either signal this by a one-bit indication to initiate dynamic random access, or signal by a one-bit indication plus dedicated preamble code information and possibly associated timing information or other information (e.g., a validation of the dynamic RACH duration) to initiate dynamic random access. If the UE receives the network signal without the dedicated preamble, the UE performs random access by selecting the preamble code randomly from among the candidate preamble codes from the earliest candidate time and frequency RACH resource among those configured in the first RACH configuration in the system information. If the UE receives a dedicated preamble code from the network, the UE performs random access by using the indicated preamble code from the earliest candidate time and frequency RACH resource among those configured in the first RACH configuration in the system information. If the UE receives the associated timer information from the network signal, the UE performs random access as described above using dynamic RACH until the timer expires (e.g., the timer is started when the UE receives the network signal). This timer can be either a reused T304 timer or a new tinier to indicate the validation of the dynamic RACH. When the tinier expires, the UE may fall back to legacy RACH and use the second set of RACH resources. If the UE initiates random access in other cases (i.e., cases other than those in which the network initiates random access by including dynamic RACH-related information), the UE performs random access by using the second (regular RACH) RACH configuration signaled via the system information. As another example, when the UE receives the network signal to initiate dynamic RACH, the UE performs random access from the earliest candidate time and frequency RACH resource among those configured in the first RACH configuration and the second RACH configuration. In some embodiments, the RACH resource can be pre-configured (e.g., fixed) and only enabled at the UE for handover or paging purposes. In other embodiments, the RACH resource can be dynamic and change when handover events happen. In such embodiments, the network signals via dedicated signaling via RRC message. In other embodiments, the RACH resource may be signaled via a system information block (SIB).

In a second embodiment of the two alternatives mentioned above, no separate RACH configuration is signaled via the system information for the network-initiated dynamic random access case. RACH configuration information (e.g., time and frequency RACH resource information, preamble code set information, etc.) is also included in the network signal (e.g., via dedicated signaling such as RRC) to initiate dynamic random access to the UE. For example, a starting physical resource block index/number, a number of physical resource blocks from the starting physical resource block index/number, a time index (e.g., bitmap information 1010101010 which indicates that the RACH resource is available in the first, third, fifth, seventh, and ninth slots/subframes, or any other type of value (e.g., integer) to indicate similar information to that described in the bitmap), and the preamble code set (or dedicated preamble code) information can be directly included in the network signal to initiate dynamic random access to the UE. If the UE receives the network signal, the UE performs random access by using the indicated RACH resource from the earliest candidate time and frequency RACH resource among those indicated in the network signal. If the UE receives a dedicated preamble code from the network, the UE performs random access by using the indicated preamble code from the earliest candidate time and frequency RACH resource among those indicated in the network signal. If the UE receives associated timer information from the network signal, the UE performs random access as described above until the timer expires (e.g., the timer is started when the UE receives the network signal). If the UE initiates random access in other cases (i.e. cases other than those in which the network initiates random access by including dynamic RACH configuration information), the UE performs random access by using the RACH configuration signaled via the system information. As another example, when the UE receives the network signal to initiate dynamic RACH, the UE performs random access from the earliest candidate time and frequency RACH resource among those indicated in the network signal and configured via the system information.

In both of the two alternatives above, the network signal can be implemented as follows in different embodiments. In one embodiment, the network signal is a UE-dedicated RRC message (e.g., a handover one option command or any other type of UE-dedicated RRC message). In a second such embodiment, the network signal is UE-dedicated media access control (MAC) control information (e.g., as part of MAC CE or MAC HD). In a third embodiment, the network signal is UE-dedicated PHY control information (e.g., as part of the PDCCH, etc.).

FIG. 2 illustrates an example method 200 performed by a UE (e.g., the UE 101, 102), in accordance with embodiments described herein. In some embodiments, the method 200 of FIG. 2 may be implemented by one or more processors of a UE or an apparatus of any UE or machine that includes processing circuitry. In other embodiments, the method 200 may be implemented as computer-readable instructions in a storage medium that, when executed by one or more processors of a device, cause the device to perform the method 200.

The method 200 begins with operation 205 performed by a UE to decode a configuration communication from a base station to identify a plurality of dedicated random access parameters. In various operations, the configuration communication may be stored in a memory or received at the processing circuitry via an interface, with the configuration communication comprising a dynamic dedicated random access channel (RACH) configuration (RACH-ConfigDedicated) information element, the RACH-ConfigDedicated information element comprising a plurality of dedicated random access parameters. In some embodiments, this may he preceded by the UE performing measurements on a plurality of beams from the base station, and generating and sending a measurement report with the beam measurements to the bases station, with the base station selecting a beam based on the measurement report. In some embodiments, this is then used by the network to configure the dedicated RACH using the selected beam. The configuration communication may then further be sent to the UE and processed in operation 205 based on the beam and additional information selected at the base station based on the measurement report. The UE then uses the dedicated random access parameters from the RACH-ConfigDedicated information element to set up a RACH procedure in operation 210, and in operation 215, the UE may perform the RACH procedure using the plurality of dedicated random access parameters.

In some embodiments, the method 200 may operate where the configuration communication comprises an RRC-ConnectionReconfiguration communication, where the RRCConnectionReconfiguration communication is received at the UE as part of an information element indicating a handover operation using the plurality of dedicated random access parameters. In some such embodiments, the setup of the RACH procedure comprises setup of the handover operation using the plurality of dedicated random access parameters from the RACH-ConfigDedicated information element. The plurality of dedicated random access parameters may include combinations of a PreambleIndex parameter, a timing resource parameter, and/or a frequency resource parameter.

In some embodiments, the operations of the method 200 may be followed by further operations to perform the RACH procedure until a timer associated with the timing resource parameter expires, and to perform a fallback RACH procedure after the timer expires. Further embodiments may include operations to determine that the RRCConnectionReconfiguration communication does not include a dedicated preamble indication, and in response to the determination that the RRCConnectionReconfiguration communication does not include the dedicated preamble indication, select a preamble code randomly from among a set of candidate preamble codes from an earliest candidate time and frequency RACH resource configured in the plurality of dedicated random access parameters.

In some embodiments, the RACH procedure is allocated to repeat periodically with respect to a set of subframes until a handover operation is complete when the UE does not know a target system frame number (SFN). In other embodiments, an end to the RACH procedure is indicated by the base station in terms of a source cell SFN. In further embodiments, the method 200 may additionally be followed by operations to receive a plurality of network beams, determine that a first network beam of the plurality of network beams has the highest measured signal, and initiate an indication associated with the network beam to the base station. In some such embodiments, the configuration communication is received via the network beam repeatedly until the UE receives a random access response (RAR) message.

Figure 3:
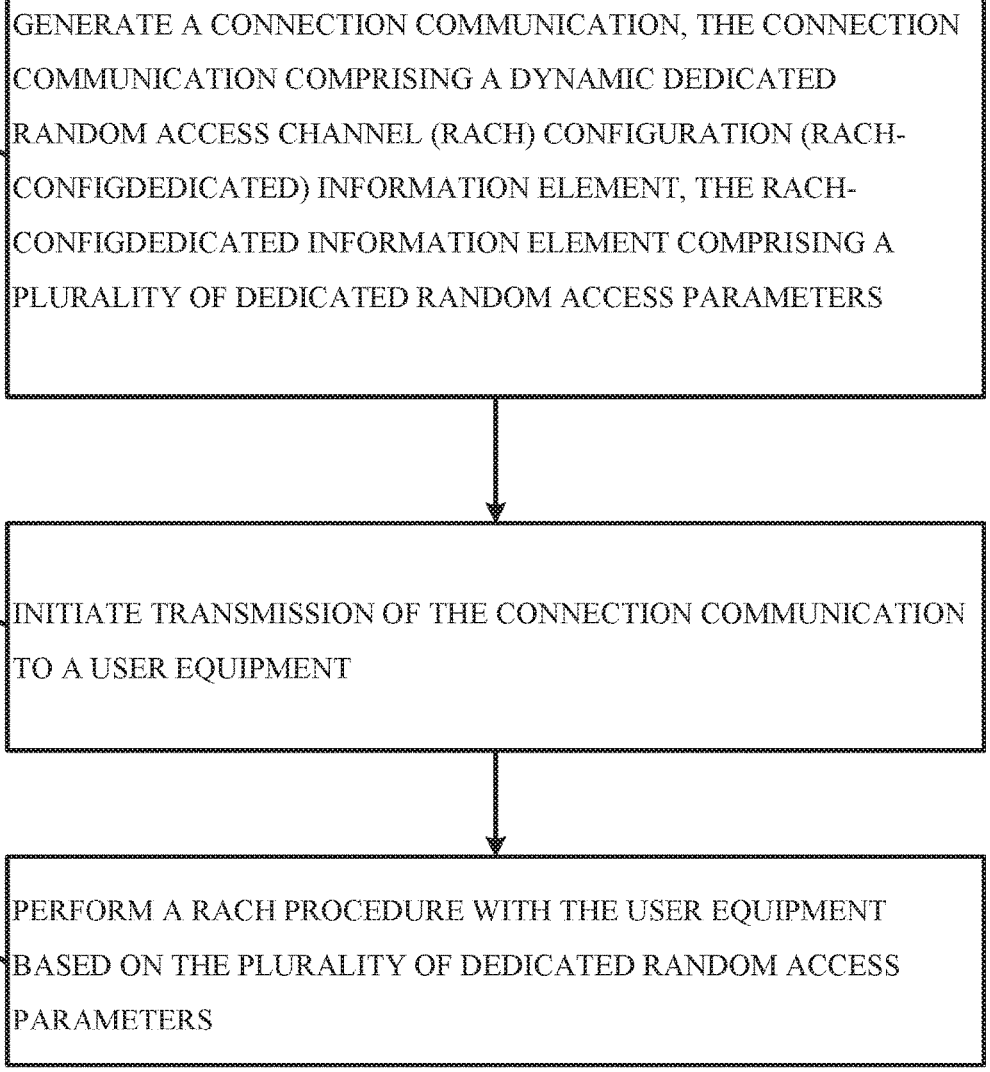
FIG. 3 describes a method for dynamic random access channel (RACH) operation in accordance with some embodiments.

FIG. 3 illustrates an example method 300 that may be performed by a base station or an apparatus of a base station with processing circuitry, in accordance with embodiments described herein. The method 300 may, for example, be a complementary set of operations performed by an apparatus of a base station while a corresponding UE performs the method 200. In some embodiments, processors of different devices within a network other than a base station may perform some or all of the operations of the method 300. In other embodiments, the method 300 may be implemented as computer-readable instructions in a storage medium that, when executed by one or more processors of one or more base station devices (e.g., an eNB or other device of a 3GPP network), cause the one or more devices to perform the method 300.

The method 300 begins with operation 305 to generate a connection communication, the connection communication comprising a dynamic dedicated random access channel (RACH) configuration (RACH-ConfigDedicated) information element, the RACH-ConfigDedicated information element comprising a plurality of dedicated random access parameters. In some embodiments, this may be preceded by the UE sending a measurement report to the bases station, with the base station selecting a beam based on the measurement report. In some embodiments, this is then used by the network to configure the dedicated RACH using the selected beam. Then in operation 310, the base station initiates transmission of the connection communication to a and in operation 315, performs a RACH procedure (e.g., a handover operation) in conjunction with the UE using the plurality of dedicated random access parameters. Additional operations may be performed by the base station in conjunction with operations similar to those described above by a UE. For example, the base station may perform or repeat the RACH procedure until a timer associated with the timing resource parameter expires or until a connection is established and a random access response generated and sent to the UE. If the timer expires before the connection is established and the RAR sent, the base station may perform a fallback RACH operation different from the initial (e.g., dynamic) RACH operation.

For handover purposes, such dynamic RACH configuration information (e.g., resource or configuration communication) can be sent to the UE via an RRCConnectionReconfiguration communication with a mobilityInfo (HO command) information element. Below is an example information element (IE). In other embodiments, other similar information elements may be used.

MobilityControlInfo Information Element

```
-- ASN1START
MobilityControlInfo ::=            SEQUENCE {
    targetPhysCellId                          PhysCellId,
    carrierFreq                               CarrierFreqEUTRA
    OPTIONAL,       -- Cond HO--toEUTRA2
    carrierBandwidth                          CarrierBandwidthEUTRA
    OPTIONAL,       -- Cond HO-toEUTRA
    additionalSpectrumEmission                AdditionalSpectrumEmission
    OPTIONAL,       -- Cond HO-toEUTRA
    t304                                      ENUMERATED {
                                                  ms50, ms100, ms150, ms200, ms500,
ms1000,
                                                  ms2000, ms10000-v1310},
    newUE-Identity                            C-RNTI,
    radioResourceConfigCommon                 RadioResourceConfigCommon,
    rach-ConfigDedicated                      RACH-ConfigDedicated
    OPTIONAL,       -- Need OP
    ...,
    [[  carrierFreq-v9e0                      CarrierFreqEUTPA-v9e0
    OPTIONAL        -- Need ON
    ]],
    [[  drb-ContinueROHC-r11                  ENUMERATED {true}
    OPTIONAL        -- Cond NO
    ]],
    [[  mobilityControlInfoV2X-r14            MobilityControlInfoV2X-r14
    OPTIONAL        -- Need OR
    ]]
}
MobilityControlInfoSCG-r12 ::=     SEQUENCE {
    t307-r12                                  ENUMERATED {
                                                  ms50, ms100, ms150, ms200, ms500,
ms1000,
                                                  ms2000, spare1},
    ue-IdentitySCG-r12                        C-
```

```
                                -continued
RNTI                          OPTIONAL,     -- Cond SCGEst,
    rach-ConfigDedicated-r12                RACH-
ConfigDedicated        OPTIONAL,     -- Need OP
    cipheringAlgorithmSCG-r12               CipheringAlgorithm-r12        OPTIONAL,     --
Need ON
    ...
    [[
    dynamicRACH-rxy               DynamicRACH-ConfigDedicated         OPTIONAL,     --
Need OR
    ]]
}
MobilityControlInfoV2X-r14 ::=         SEQUENCE {
    v2x-CommTxPoolExceptional-r14           SL-CommResourcePoolV2X-
r14       OPTIONAL,       -- Need OR
    v2x-CommRxPool-r14                      SL-CommRxPoolListV2X-
r14       OPTIONAL,       -- Need OR
    v2x-CommSyncConfig-r14                  SL-SyncConfigListV2X-
r14       OPTIONAL        -- Need OR
}
CarrierBandwidthEUTRA ::=              SEQUENCE {
    dl-Bandwidth                            ENUMERATED {
                                                n6, n15, n25, n50, n75, n100,
spare10,
                                                spare9, spare8, spare7, spare6,
spare5,
                                                spare4, spare3, spare2, spare1},
    ul-Bandwidth                            ENUMERATED {
                                                n6, n15, n25, n50, n75, n100,
spare10,
                                                spare9, spare8, spare7, spare6,
spare5,
                                                spare4, spare3, spare2, spare1}
        OPTIONAL -- Need OP
}
CarrierFreqEUTRA ::=                   SEQUENCE {
    dl-CarrierFreq                          ARFCN-ValueEUTRA,
    ul-CarrierFreq                          ARFCN-
ValueEUTRA        OPTIONAL     -- Cond FDD
}
CarrierFreqEUTRA-v9e0 ::=              SEQUENCE {
    dl-CarrierFreq-v9e0                     ARFCN-ValueEUTRA-r9,
    ul-CarrierFreq-v9e0                     ARFCN-ValueEUTRA-r9          OPTIONAL     -
- Cond FDD
}
DynamicRACH-ConfigDedicated ::=        SEQUENCE {
    ra-PreambleIndex                        INTEGEP (0..63),
    ra-PRACH-resource                       ENUMERATED {sf2, sf5, sf10},
    ra-StartSubframe-r14                    INTEGER (0..9)
}
-- ASN1STOP
```

The above dynamic RACH-ConfigDedicated information element is only an example to show what the dynamic RACH resource may look like. It is to signal to the UE which resource, in addition to a regular RACH resource, it can use for handover purposes. In this embodiment, since the UE may not read the MIB or SIB of the target cell, the dynamic RACH may be in a periodic form in terms of subframe since the UE may not know the target SFN. In this case, the target eNB may need to allocate the dynamic RACH until the handover is completed. Alternatively, the target eNB may need to indicate the end of the dynamic RACH in terms of the source cell SFN.

In other embodiments, a configuration communication may be a RACH signal sent via SIB. Even though handover does not require the UE to read the system information from the target cell, the target base station or eNB can still broadcast this information via SIB. In some embodiments, this is done so that the other UE including a handover UE may use the dynamic RACH for handover in addition to the regular RACH occasion. In this embodiment, additional RACH resources may be indicated in addition to the regular RACH occasion in the SIB. Similar information to that in the dynamicRACH-ConfigDedicated information element described above can he signaled in the SIB, except the preamble part.

In still another embodiment, a connection communication may be a dynamic RACH signal sent via the PDCCH. In such an embodiment, the target cell indicates the dynamic RACH in the PDCCH, and the UE can monitor the PDCCH of the target cell for such a RACH occasion, in case it is earlier than the regular RACH and can be used for handover purposes to reduce interruption time. In such embodiments, the target cell can indicate this option to the UE via HO command so the UE will monitor the PDCCH for the dynamic RACH.

MobilityControlInfo Information Element for Dynamic RACH With PDCCH:

```
-- ASN1START
MobilityControlInto ::=          SEQUENCE {
    targetPhysCellId                    PhysCellId,
```

-continued

```
    carrierFreq                     CarrierFreqEUTRA
        OPTIONAL,      -- Cond HO-toEUTRA2
    carrierBandwidth                CarrierBandwidthEUTRA
        OPTIONAL,      -- Cond HO-toEUTRA
    additionalSpectrumEmission      AdditionalSpectrumEmission
        OPTIONAL,      -- Cond HO-toEUTRA
    t304                            ENUMERATED {
                                        ms50, ms100, ms150, ms200, ms500,
ms1000,
                                        ms2000, ms10000-v1310},
    newUE-Identity                  C-RNTI,
    radioResourceConfigCommon       RadioResourceConfigCommon,
    rach-ConfigDedicated            RACH-ConfigDedicated
        OPTIONAL,      -- Need OP
    ...,
    [[ carrierFreq-v9e0             CarrierFreqEUTRA v9e0
        OPTIONAL       -- Need ON
    ]],
    [[ drb-ContinueROHC-r11         ENUMERATED {true}
        OPTIONAL       -- Cond HO
    ]],
    [[ mobilityControlInfoV2X-r14   MobilityControlInfoV2X-14
        OPTIONAL       -- Need OR
    ]]
}
MobilityControlInfoSCG-r12 ::=      SEQUENCE {
    t307-r12                        ENUMERATED {
                                        ms50, ms100, ms150, ms200, ms500,
ms1000,
                                        ms2000, spare1},
    ue-IdentitySCG-r12              C-
RNTI                   OPTIONAL,    -- Cond SCGEst,
    rach-ConfigDedicated-r12        RACH-
ConfigDedicated       OPTIONAL,    -- Need OP
    cipheringAlgorithmSCG-r12       CipheringAlgorithm-r12   OPTIONAL,   --
Need ON
    ...
    [[
    dynamicRACHviaPDCCH-rxy         ENUMERATED
{true}                  OPTIONAL,   -- Need OR
    ]]
}
MobilityControlInfoV2X-r14 ::= SEQUENCE {
    v2x-CommTxPoolExceptional-r14   SL-CommResourcePoolV2X-
r14     OPTIONAL,        -- Need OR
    v2x-CommRxPool-r14              SL-CommRxPoolListV2X-
r14     OPTIONAL,        -- Need OR
    v2x-CommSyncConfig-r14          SL-SyncConfigListV2X-
r14     OPTIONAL         -- Need OR
}
CarrierBandwidthEUTRA ::=           SEQUENCE {
    dl-Bandwidth                    ENUMERATED {
                                        n6, n15, n25, n50, n75, n100,
spare10,
                                        spare9, spare8, spare7, spare6,
spare5,
                                        spare4, spare3, spare2, spare1},
    ul-Bandwidth                    ENUMERATED {
                                        n6, n15, n25, n50, n75, n100,
spare10,
                                        spare9, spare8, spare7, spare6,
spare5,
                                        spare4, spare3, spare2, spare1}
        OPTIONAL -- Need OP
}
CarrierFreqEUTRA ::=                SEQUENCE {
    dl-CarrierFreq                  ARFCN-ValueEUTRA,
    ul-CarrierFreq                  ARFCN-
ValueEUTRA            OPTIONAL     -- Cond FDD
}
CarrierFreqEUTRA-v9e0 ::=           SEQUENCE {
    dl-CarrierFreq-v9e0             ARFCN-ValueEUTRA-r9,
    ul-CarrierFreq-v9e0             ARFCH-ValueEUTRA-r9  OPTIONAL    -
- Cond FDD
}
```

In some embodiments with such dynamic RACH with PDCCH, a dedicated preamble will still be allocated to this handover UE via HO command, and the UE will then monitor the PDCCH of the target cell to see when dynamic RACH is available. The UE may use the regular RACH occasion or the dynamic RACH, whichever comes first. In this option, the network may also include a dynamic RACH configuration, such as the number of beams per time, frequency resources, etc.

FIG. 4 illustrates an example method 400 performed by a UE in accordance with some embodiments described herein. In some embodiments, the method 400 of FIG. 4 may be implemented by one or more processors of a UE or an apparatus of any UE or machine that includes processing circuitry. In other embodiments, the method 400 may be implemented as computer-readable instructions in a storage medium that, when executed by one or more processors of a device, cause the device to perform the method 400.

Method 400 begins with operation 405 to decode an RRCConnectionReconfiguration communication from a base station, the RRCConnectionReconfiguration communication comprising an information element indicating a handover operation and a dynamic dedicated random access channel (RACH) configuration (RACH-ConfigDedicated) information element, the RACH-ConfigDedicated information element comprising a plurality of dedicated random access parameters. Operation 410 then involves taking the decoded RRCConnectionReconfiguration communication using the included information to set up the handover operation using the plurality of dedicated random access parameters from the RACH-ConfigDedicated information element. The handover operations are then performed in operation 415, and may include any handover operations described herein. This may include an incomplete dynamic RACH process with a fallback operation, a complete dynamic RACH process, or any other such described operations.

The methods describe particular embodiments, but it will be apparent that additional methods, in accordance with the embodiments described herein, are possible with repeated or intervening operations to provide dynamic RACH. For example, additional embodiments of operations at a UE are described above, and it will be apparent that corresponding eNB or base station operations other than those of the methods 300 will occur in conjunction with the described operations. Further still, any embodiments described above may be performed with repeated operations or intervening operations in various different embodiments. Additionally, some embodiments may include UEs that perform both methods 200 and 400 with various combinations of the described operations, and corresponding operations at a base station. Any of these operations may then additionally involve generation or processing of communications, information elements, and/or fields described above in addition to the particular communications, information elements, and fields of the above methods. An additional set of non-exhaustive embodiments is further presented below.

EXAMPLE EMBODIMENTS

Example 1 may include a dynamic random access channel (RACH) signal via a handover (HO) command.

Example 2 may include a dynamic RACH signal via a system information block (SIB).

Example 3 may include a dynamic RACH signal via a physical downlink control channel (PDCCH).

Example 4 may include a user equipment (UE) includes which best network (NW) beams (index) or top N index during measurement for each neighboring cell in a measurement report.

Example 5 may include a source cell forwarding the best NW beam index or top N index to a target cell in an HO request message when dynamic RACH is configured.

Example 6 may include the network ordering the beam to receive RACH based on an order for dynamic RACH to a specific UE.

Example 7 may include an apparatus comprising means to perform one or more elements of a method described in or related to any of examples 1-6, or any other method or process described herein.

Example 8 may include one or more non-transitory computer-readable media comprising instructions to cause an electronic device, upon execution of the instructions by one or more processors of the electronic device, to perform one or more elements of a method described in or related to any of examples 1-6, or any other method or process described herein.

Example 9 may include an apparatus comprising logic, modules, and/or circuitry to perform one or more elements of a method described in or related to any of examples 1-6, or any other method or process described herein.

Example 10 may include a method, technique, or process as described in or related to any of examples 1-6, or portions or parts thereof.

Example 11 may include an apparatus comprising one or more processors and one or more computer-readable media comprising instructions that, when executed by the one or more processors, cause the one or more processors to perform a method, technique, or process as described in or related to any of examples 1-6, or portions thereof.

Example 12 may include a method of communicating in a wireless network as shown and described herein.

Example 13 may include a system for providing wireless communication as shown and described herein.

Example 14 may include a device for providing wireless communication as shown and described herein.

Example 15 is an apparatus of a user equipment (UE), the apparatus comprising: a memory configured to store a configuration communication from a base station, the configuration communication comprising a dynamic dedicated random access channel (RACH) configuration (RACH-ConfigDedicated) information element, the RACH-ConfigDedicated information element comprising a plurality of dedicated random access parameters; and processing circuitry coupled to the memory and configured to: decode the configuration communication from the base station to identify the plurality of dedicated random access parameters; and set up a RACH procedure for connection to the base station using the plurality of dedicated random access parameters.

In Example 16, the subject matter of Example 15 optionally includes wherein the configuration communication comprises an RRCConnectionReconfiguration communication.

In Example 17, the subject matter of Example 16 optionally includes wherein the RRCConnectionReconfiguration communication is received at the UE as part of an information element indicating a handover operation using the plurality of dedicated random access parameters.

In Example 18, the subject matter of Example 17 optionally includes wherein the setup of the RACH procedure comprises setup of the handover operation using the plurality of dedicated random access parameters from the RACH-ConfigDedicated information element.

In Example 19, the subject matter of Example 18 optionally includes wherein the plurality of dedicated random access parameters comprises at least a PreambleIndex parameter and a timing resource parameter.

In Example 20, the subject matter of Example 19 optionally includes wherein the timing resource parameter indicates reuse of a T304 timer.

In Example 21, the subject matter of any one or more of Examples 19-20 optionally include wherein the processing circuitry is further configured to: perform the RACH procedure until a timer associated with the timing resource parameter expires; and perform a fallback RACH procedure after the timer expires.

In Example 22, the subject matter of any one or more of Examples 19-21 optionally include wherein the plurality of dedicated random access parameters further comprises a frequency resource parameter.

In Example 23, the subject matter of any one or more of Examples 17-22 optionally include-5 wherein the information element indicating the handover operation comprises a MobilityInfo or a MobilityControlInfo information element.

In Example 24, the subject matter of any one or more of Examples 16-23 optionally include-5 wherein the processing circuitry is further configured to: determine that the RRCConnectionReconfiguration communication does not include a dedicated preamble indication; and in response to the determination that the RRCConnectionReconfiguration communication does not include the dedicated preamble indication, select a preamble code randomly from among a set of candidate preamble codes from an earliest candidate time and frequency RACH resource configured in the plurality of dedicated random access parameters.

In Example 25, the subject matter of any one or more of Examples 5-24 optionally include-8 wherein the RACH procedure is allocated to repeat periodically with respect to a set of subframes until a handover operation is complete when the UE does not know a target system frame number (SFN).

In Example 26, the subject matter of any one or more of Examples 15-25 optionally include wherein an end to the RACH procedure is indicated by the base station in terms of a source cell system frame number (SFN).

In Example 27, the subject matter of any one or more of Examples 15-26 optionally include wherein the configuration communication comprises a system information block (SIB) broadcast by the base station.

In Example 28, the subject matter of any one or more of Examples 15-27 optionally include wherein the configuration communication comprises a Physical Downlink Control Channel (PDCCH) communication; and wherein the processing circuitry is further configured to monitor a PDCCH for the configuration communication.

In Example 29, the subject matter of any one or more of Examples 15-28 optionally include-8 further comprising: radio frequency circuitry coupled to the processing circuitry; and one or more antennas coupled to the radio frequency circuitry and configured to receive the configuration communication from the base station.

In Example 30, the subject matter of Example 29 optionally includes wherein the one or more antennas are configured to receive a plurality of network beams; wherein the processing circuitry is further configured to determine that a first network beam of the plurality of network beams has a highest measured signal and to initiate an indication associated with the first network beam to the base station; and wherein the configuration communication is received via the first network beam until the UE receives a random access response (RAR) message.

Example 31 is a computer-readable storage medium comprising instructions that, when executed by one or more processors of a user equipment (UE), cause the UE to: decode an RRCConnectionReconfiguration communication from a base station to identify a plurality of dedicated random access parameters, wherein the RRCConnectionReconfiguration communication comprises an information element indicating a handover operation and a dynamic dedicated random access channel (RACH) configuration (RACH-ConfigDedicated) information element, the RACH-ConfigDedicated information element comprising the plurality of dedicated random access parameters; and set up the handover operation using the plurality of dedicated random access parameters from the RACH-ConfigDedicated information element.

In Example 32, the subject matter of Example 31 optionally includes wherein the plurality of dedicated random access parameters comprises at least a PreambleIndex parameter and a timing resource parameter.

In Example 33, the subject matter of Example 32 optionally includes wherein the timing resource parameter indicates reuse of a T304 timer.

In Example 34, the subject matter of any one or more of Examples 32-33 optionally include wherein the instructions further cause the UE to: perform the handover procedure until a tinier associated with the timing resource parameter expires; and perform a fallback handover procedure after the timer expires.

In Example 35, the subject matter of any one or more of Examples 31-34 optionally include wherein the plurality of dedicated random access parameters further comprises a frequency resource parameter.

Example 36 is an apparatus of a base station, the apparatus comprising: processing circuitry configured to: generate a connection communication, the connection communication comprising a dynamic dedicated random access channel (RACH) configuration (RACH-ConfigDedicated) information element, the RACH-ConfigDedicated information element comprising a plurality of dedicated random access parameters; and initiate transmission of the connection communication to a user equipment (UE), and an interface, wherein the connection communication is communicated to the UE via the interface.

In Example 37, the subject matter of Example 36 optionally includes wherein the connection communication comprises an RRCConnectionReconfiguration communication; and wherein the RRCConnectionReconfiguration communication is transmitted to the UE as part of an information element indicating a handover operation using the plurality of dedicated random access parameters.

In Example 38, the subject matter of Example 37 optionally includes wherein the plurality of dedicated random access parameters comprises at least a PreambleIndex parameter, a timing resource parameter, and a frequency resource parameter.

Example 39 is an apparatus of a user equipment (UE), the apparatus comprising: a memory configured to store an RRCConnectionReconfiguration communication from a base station, the RRCConnectionReconfiguration communication comprising an information element indicating a handover operation and a dynamic dedicated random access channel (RACH) configuration (RACH-ConfigDedicated) information element, the RACH-ConfigDedicated information element comprising a plurality of dedicated random access parameters; and processing circuitry coupled to the memory and configured to: decode the RRCConnectionReconfiguration communication from the base station to identify the plurality of dedicated random access parameters; and set up the handover operation using the plurality of dedicated random access parameters from the RACH-ConfigDedicated information element.

Example 40 is an apparatus of a user equipment (UE), the apparatus comprising: means for storing a configuration communication from a base station, the configuration communication comprising a dynamic dedicated random access channel (RACH) configuration (RACH-ConfigDedicated) information element, the RACH-ConfigDedicated information element comprising a plurality of dedicated random access parameters; means for decoding the configuration communication from the base station to identify the plurality of dedicated random access parameters; and means for setting up a RACH procedure for connection to the base station using the plurality of dedicated random access parameters.

In Example 41, the subject matter of Example 40 optionally includes wherein the configuration communication comprises an RRCConnectionReconfiguration communication.

In Example 42, the subject matter of Example 41 optionally includes wherein the RRCConnectionReconfiguration communication is received at the UE as part of an information element indicating a handover operation using the plurality of dedicated random access parameters.

In Example 43, the subject matter of Example 42 optionally includes wherein the setup of the RACH procedure comprises setup of the handover operation using the plurality of dedicated random access parameters from the RACH-ConfigDedicated information element.

In Example 44, the subject matter of Example 43 optionally includes wherein the plurality of dedicated random access parameters comprises at least a PreambleIndex parameter and a timing resource parameter.

In Example 45, the subject matter of Example 44 optionally includes wherein the timing resource parameter indicates reuse of a T304 timer.

In Example 46, the subject matter of any one or more of Examples 44-45 optionally include further comprising: means for performing the RACH procedure until a timer associated with the timing resource parameter expires; and means for performing a fallback RACH procedure after the timer expires.

In Example 47, the subject matter of any one or more of Examples 44-46 optionally include wherein the plurality of dedicated random access parameters further comprises a frequency resource parameter.

In Example 48, the subject matter of any one or more of Examples 42-47 optionally include-30 wherein the information element indicating the handover operation comprises a MobilityInfo or a MobilityControlInfo information element.

In Example 49, the subject matter of any one or more of Examples 42-48 optionally include-30 further comprising: means for determining that the RRCConnectionReconfiguration communication does not include a dedicated preamble indication; and means for selecting a preamble code randomly from among a set of candidate preamble codes from an earliest candidate time and frequency RACH resource configured in the plurality of dedicated random access parameters in response to the determination that the RRCConnectionReconfiguration communication does not include the dedicated preamble indication.

In Example 50, the subject matter of any one or more of Examples 40-49 optionally include wherein the RACH procedure is allocated to repeat periodically with respect to a set of subframes until a handover operation is complete when the UE does not know a target system frame number (SFN).

In Example 51, the subject matter of any one or more of Examples 40-50 optionally include wherein an end to the RACH procedure is indicated by the base station in terms of a source cell system frame number (SFN).

In Example 52, the subject matter of any one or more of Examples 40-51 optionally include wherein the configuration communication comprises a system information block (SIB) broadcast by the base station.

In Example 53, the subject matter of any one or more of Examples 40-52 optionally include wherein the configuration communication comprises a Physical Downlink Control Channel (PDCCH) communication; and wherein the processing circuitry is further configured to monitor a PDCCH for the configuration communication.

In Example 54, the subject matter of any one or more of Examples 40-53 optionally include further comprising: radio frequency circuitry coupled to the processing circuitry; and means for receiving the configuration communication from the base station.

In Example 55, the subject matter of Example 54 optionally includes wherein the one or more antennas are configured to receive a plurality of network beams; wherein the processing circuitry is further configured to determine that a first network beam of the plurality of network beams has a highest measured signal and to initiate an indication associated with the first network beam to the base station; and wherein the configuration communication is received via the first network beam until the UE receives a random access response (RAR) message.

Example 56 is a method for dynamic random access channel (RACH) operation comprising: decoding an RRCConnectionReconfiguration communication from a base station to identify a plurality of dedicated random access parameters, wherein the RRCConnectionReconfiguration communication comprises an information element indicating a handover operation and a dynamic dedicated RACH configuration (RACH-ConfigDedicated) information element, the RACH-ConfigDedicated information element comprising the plurality of dedicated random access parameters; setting up the handover operation using the plurality of dedicated random access parameters from the RACH-ConfigDedicated information element; and performing the handover operation based on the plurality of dedicated random access parameters.

In Example 57, the subject matter of Example 56 optionally includes wherein the plurality of dedicated random access parameters comprises at least a PreambleIndex parameter and a timing resource parameter.

In Example 58, the subject matter of Example 57 optionally includes wherein the timing resource parameter indicates reuse of a T304 timer.

In Example 59, the subject matter of any one or more of Examples 57-58 optionally include wherein the instructions further cause the UE to: perform the handover procedure until a timer associated with the timing resource parameter expires; and perform a fallback handover procedure after the timer expires.

In Example 60, the subject matter of any one or more of Examples 56-59 optionally include wherein the plurality of dedicated random access parameters further comprises a frequency resource parameter.

Example 61 is an apparatus of a base station, the apparatus comprising: means for generating a connection communication, the connection communication comprising a dynamic dedicated random access channel (RACH) configuration (RACH-ConfigDedicated) information element, the RACH-ConfigDedicated information element comprising a plurality of dedicated random access parameters; and means for initiating transmission of the connection communication to a user equipment (UE); and means for communicating the connection communication to the UE.

In Example 62, the subject matter of any one or more of Examples 36-61 optionally include wherein the connection communication comprises an RRCConnectionReconfiguration communication; and wherein the RRCConnectionReconfiguration communication is transmitted to the UE as part of an information element indicating a handover operation using the plurality of dedicated random access parameters.

In Example 63, the subject matter of any one or more of Examples 37-62 optionally include wherein the plurality of dedicated random access parameters comprises at least a PreambleIndex parameter, a timing resource parameter, and a frequency resource parameter.

Example 64 is an apparatus of a user equipment (UE), the apparatus comprising: means for storing an RRCConnectionReconfiguration communication from a base station, the RRCConnectionReconfiguration communication comprising an information element indicating a handover operation and a dynamic dedicated random access channel (RACH) configuration (RACH-ConfigDedicated) information element, the RACH-ConfigDedicated information element comprising a plurality of dedicated random access parameters; and means for decoding the RRCConnectionReconfiguration communication from the base station to identify the plurality of dedicated random access parameters; and means for setting up the handover operation using the plurality of dedicated random access parameters from the RACH-ConfigDedicated information element.

Example 65 is an apparatus of a user equipment (UE), the apparatus comprising: a memory configured to store an RRCConnectionReconfiguration communication from a base station, the RRCConnectionReconfiguration communication comprising an information element indicating a handover operation and a dynamic dedicated random access channel (RACH) configuration (RACH-ConfigDedicated) information element, the RACH-ConfigDedicated information element comprising a plurality of dedicated random access parameters; and processing circuitry coupled to the memory and configured to: decode the RRCConnectionReconfiguration communication from the base station to identify the plurality of dedicated random access parameters; and set up the handover operation using the plurality of dedicated random access parameters from the RACH-ConfigDedicated information element.

In Example 66, the subject matter of Example 65 optionally includes wherein the plurality of dedicated random access parameters comprises at least a PreambleIndex parameter and a timing resource parameter.

In Example 67, the subject matter of Example 66 optionally includes wherein the timing resource parameter indicates reuse of a T304 timer.

In Example 68, the subject matter of any one or more of Examples 66-67 optionally include wherein the processing circuitry is further configured to: perform the RACH procedure until a timer associated with the timing resource parameter expires; and perform a fallback RACH procedure after the timer expires.

In Example 69, the subject matter of any one or more of Examples 66-68 optionally include wherein the plurality of dedicated random access parameters further comprises a frequency resource parameter.

In Example 70, the subject matter of any one or more of Examples 65-69 optionally include-55 wherein the information element indicating the handover operation comprises a MobilityInfo or a MobilityControlInfo information element.

In Example 71, the subject matter of any one or more of Examples 65-70 optionally include-55 wherein the processing circuitry is further configured to: determine that the RRCConnectionReconfiguration communication does not include a dedicated preamble indication; and in response to the determination that the RRCConnectionReconfiguration communication does not include the dedicated preamble indication, select a preamble code randomly from among a set of candidate preamble codes from an earliest candidate time and frequency RACH resource configured in the plurality of dedicated random access parameters.

In Example 72, the subject matter of any one or more of Examples 65-71 optionally include-55 wherein the RACH procedure is allocated to repeat periodically with respect to a set of subframes until a handover operation is complete when the UE does not know a target system frame number (SFN).

In Example 73, the subject matter of any one or more of Examples 65-72 optionally include wherein an end to the RACH procedure is indicated by the base station in terms of a source cell system frame number (SFN).

In Example 74, the subject matter of any one or more of Examples 65-73 optionally include further comprising: radio frequency circuitry coupled to the processing circuitry; and one or more antennas coupled to the radio frequency circuitry and configured to receive the configuration communication from the base station.

In Example 75, the subject matter of Example 74 optionally includes wherein the one or more antennas are configured to receive a plurality of network beams; wherein the processing circuitry is further configured to determine that a first network beam of the plurality of network beams has a highest measured signal and to initiate an indication associated with the first network beam to the base station; and wherein the configuration communication is received via the first network beam until the UE receives a random access response (RAR) message.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

In addition to the above example embodiments, any combination of operations or elements described above may be integrated into various embodiments described herein. Additionally, other example embodiments may include any examples described above with the individual operations or device elements repeated or ordered with intervening elements or operations in any functional order.

Figure 5:
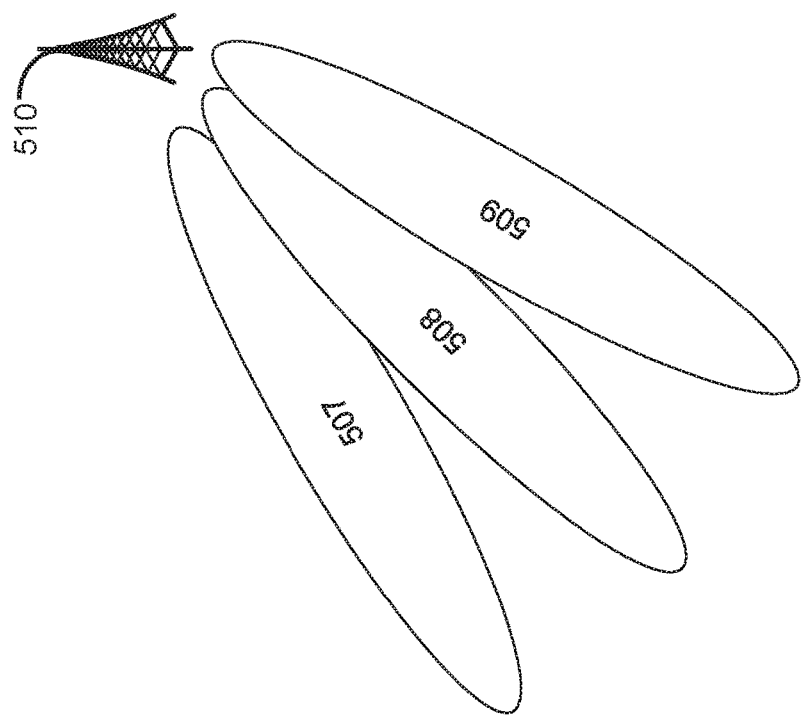
FIG. 5 illustrates aspects of a system for dynamic RACH in accordance with embodiments described herein.

FIG. 5 illustrates aspects of a system for dynamic RACH in accordance with embodiments described herein. FIG. 5 includes a base station 510. In other embodiments, the base station 510 may be any other network-side element of a network, or any device capable of generating NW beams as part of system operation. FIG. 5 additionally includes beams 507-509, along with an illustration of corresponding RACH windows 517-519 and random access responses 527-529 for each beam measured at a UE. In some embodiments, when the UE performs measurements, a beam sweep is performed as part of the measurements. If the UE can indicate which network beam (e.g., of the beams 507-509) has the highest measured signal, the UE can save an indication of the beam which is associated with a highest measured network beam value. The RACH can then start from the corresponding angle during RACH operations. In the illustrative embodiment of FIG. 5, the three highest-measured beams 507-509 are identified when the UE performs measurements. With the indication of the measurements, the network can configure an implementation to order the beams 507-509 in a RACH procedure to advantage a specific UE. When the UE receives a RAR and a connection is verified, the network can stop the beam configuration to advantage the UE. In various embodiments, this enables optimization of dynamic RACH to reduce time associated with beam sweeping (e.g., during handover operations).

Figure 6:
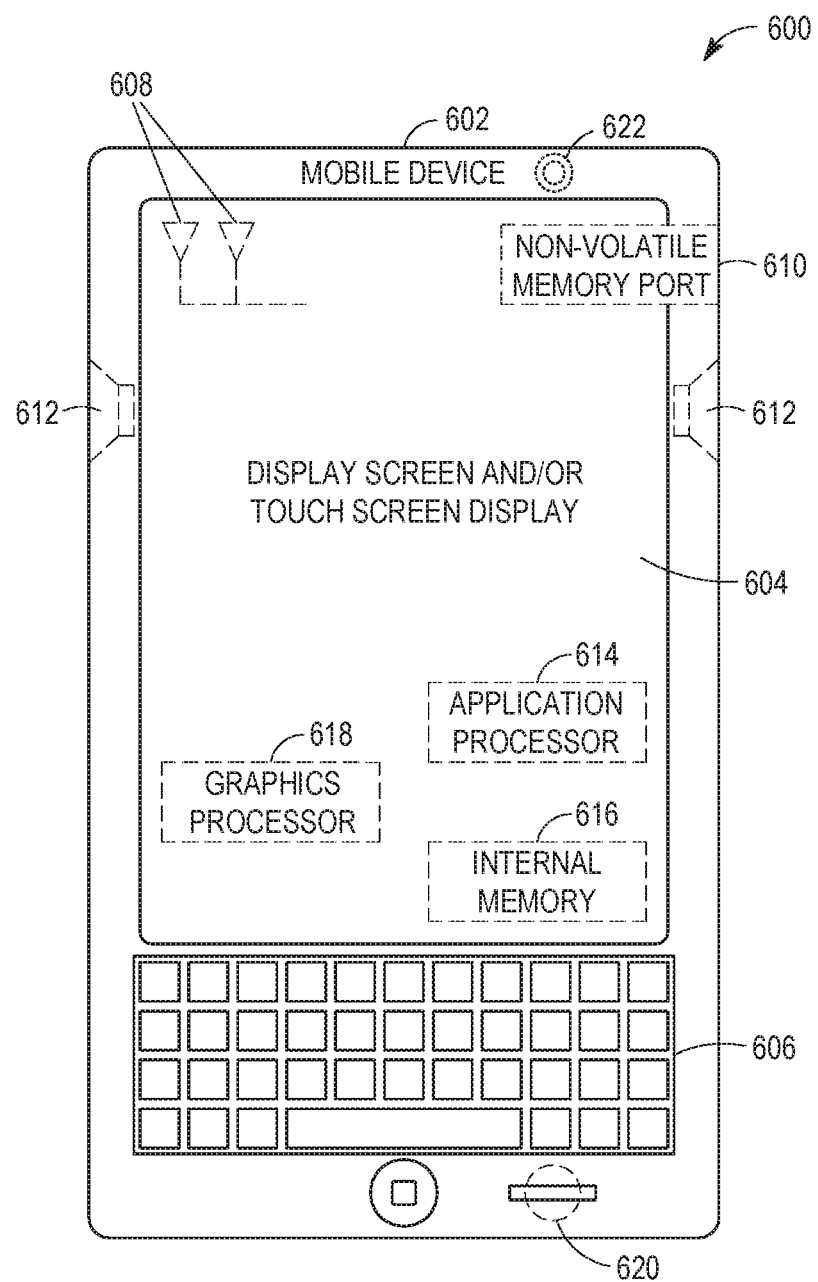
FIG. 6 illustrates an example UE, which may be configured for specialized operation or otherwise used with various embodiments described herein.

FIG. 6 shows an example UE 600. The UE 600 may be an implementation of the UEs 101, 102, or any device described herein. The UE 600 can include one or more antennas 608 configured to communicate with a transmission station, such as a base station, an eNB, or another type of wireless wide area network (WWAN) access point. The UE 600 can communicate using separate antennas for each wireless communication standard or shared antennas for multiple wireless communication standards. The UE 600 can communicate in a wireless local area network (WLAN), a wireless personal area network (WPAN), and/or a WWAN.

FIG. 6 also shows a microphone 620 and one or more speakers 612 that can be used for audio input and output to and from the UE 600. As a headed device, the UE 600 includes one or more interfaces for a UI. The UE 600 particularly includes a display screen 604, which can be a liquid crystal display (LCD) screen or another type of display screen such as an organic light-emitting diode (OLED) display. The display screen 604 can be configured as a touch screen. The touch screen can use capacitive, resistive, or another type of touch-screen technology. An application processor 614 and a graphics processor 618 can be coupled to an internal memory 616 to provide processing and display capabilities. A non-volatile memory port 610 can also be used to provide data input/output (I/O) options to a user. The non-volatile memory port 610 can also be used to expand the memory capabilities of the UE 600. A keyboard 606 can be integrated with the UE 600 or wirelessly connected to the UE 600 to provide additional user input. A virtual keyboard can also be provided using the touch screen. A camera 622 located on the front (display screen 604) side or the rear side of the UE 600 can also be integrated into a housing 602 of the UE 600.

Figure 7:
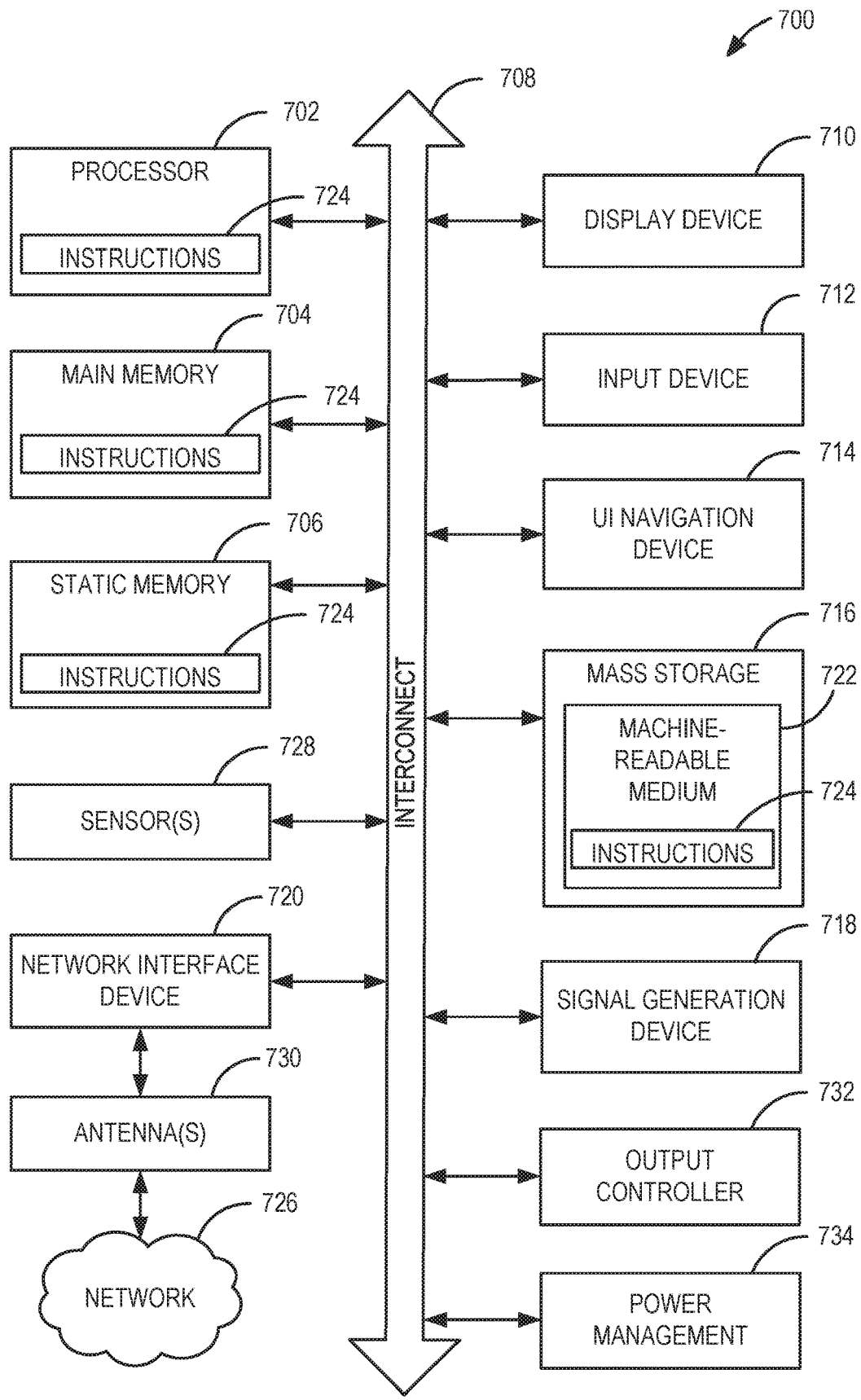
FIG. 7 is a block diagram illustrating an example computer system machine which may be used in association with various embodiments described herein.

FIG. 7 is a block diagram illustrating an example computer system machine 700 upon which any one or more of the methodologies herein discussed can be performed, and which may be used to implement the UEs 101, 102, or any other device described herein. In various alternative embodiments, the computer system machine 700 operates as a standalone device or can be connected (e.g., networked) to other machines. In a networked deployment, the computer system machine 700 can operate in the capacity of either a server or a client machine in server-client network environments, or it can act as a peer machine in peer-to-peer (or distributed) network environments. The computer system machine 700 can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, a network switch, a network bridge, or any machine capable of executing instructions (sequential or otherwise) that specify actions to be taken by that machine. Further, while only a single computer system machine 700 is illustrated, the term "machine" shall also be taken to include any collection of machines that individually or jointly execute a set (or multiple sets) of instructions to perform any one or more of the methodologies discussed herein.

The example computer system machine 700 includes a processor 702 (e.g., a central processing unit (CPU), a graphics processing unit (GPU), or both), a main memory 704, and a static memory 706, which communicate with each other via an interconnect 708 (e.g., a link, a bus, etc.). The computer system machine 700 can further include a video display device 710, an alphanumeric input device 712 (e.g., a keyboard), and a user interface (UI) navigation device 714 (e.g., a mouse). In one embodiment, the video display device 710, alphanumeric input device 712, and UI navigation device 714 are a touch-screen display. The computer system machine 700 can additionally include a mass storage device 716 (e.g., a drive unit), a signal generation device 718 (e.g., a speaker), an output controller 732, a power management controller 734, a network interface device 720 (which can include or operably communicate with one or more antennas 730, transceivers, or other wireless communications hardware), and one or more sensors 728, such as a Global Positioning System (GPS) sensor, compass, location sensor, accelerometer, or other sensor.

The mass storage device 716 includes a machine-readable medium 722 on which is stored one or more sets of data structures and instructions 724 (e.g., software) embodying or utilized by any one or more of the methodologies or functions described herein. The instructions 724 can also reside, completely or at least partially, within the main memory 704, the static memory 706, and/or the processor 702 during execution thereof by the computer system machine 700, with the main memory 704, the static memory 706, and the processor 702 also constituting machine-readable media.

While the machine-readable medium 722 is illustrated in an example embodiment to be a single medium, the term "machine-readable medium" can include a single medium or multiple media (e.g., a centralized or distributed database, and/or associated caches and servers) that store the one or more instructions 724. The term "machine-readable medium" shall also be taken to include any tangible medium that is capable of storing, encoding, or carrying instructions (e.g., the instructions 724) for execution by the machine and that cause the machine to perform any one or more of the methodologies of the present disclosure, or that is capable of storing, encoding, or carrying data structures utilized by or associated with such instructions.

The instructions 724 can further be transmitted or received over a communications network 726 using a transmission medium via the network interface device 720 utilizing any one of a number of well-known transfer protocols (e.g., hypertext transfer protocol (HTTP)). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (e.g., the instructions 724) embodied in tangible media, such as floppy diskettes, CD-ROMs, hard drives, non-transitory computer-readable storage media, or any other machine-readable storage medium wherein, when the program code is loaded into and executed by a machine, such as a computer, the machine becomes an apparatus for practicing the various techniques. In the case of program code execution on programmable computers, the computer may include a processor, a storage medium readable by the processor (including volatile and non-volatile memory and/or storage elements), at least one input device, and at least one output device. The volatile and non-volatile memory and/or storage elements may be a Random Access Memory (RAM), Erasable Programmable Read-Only Memory (EPROM), flash drive, optical drive, magnetic hard drive, or other medium for storing electronic data. The base station and UE may also include a transceiver module, a counter module, a processing module, and/or a clock module or timer module. One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

Figure 8:
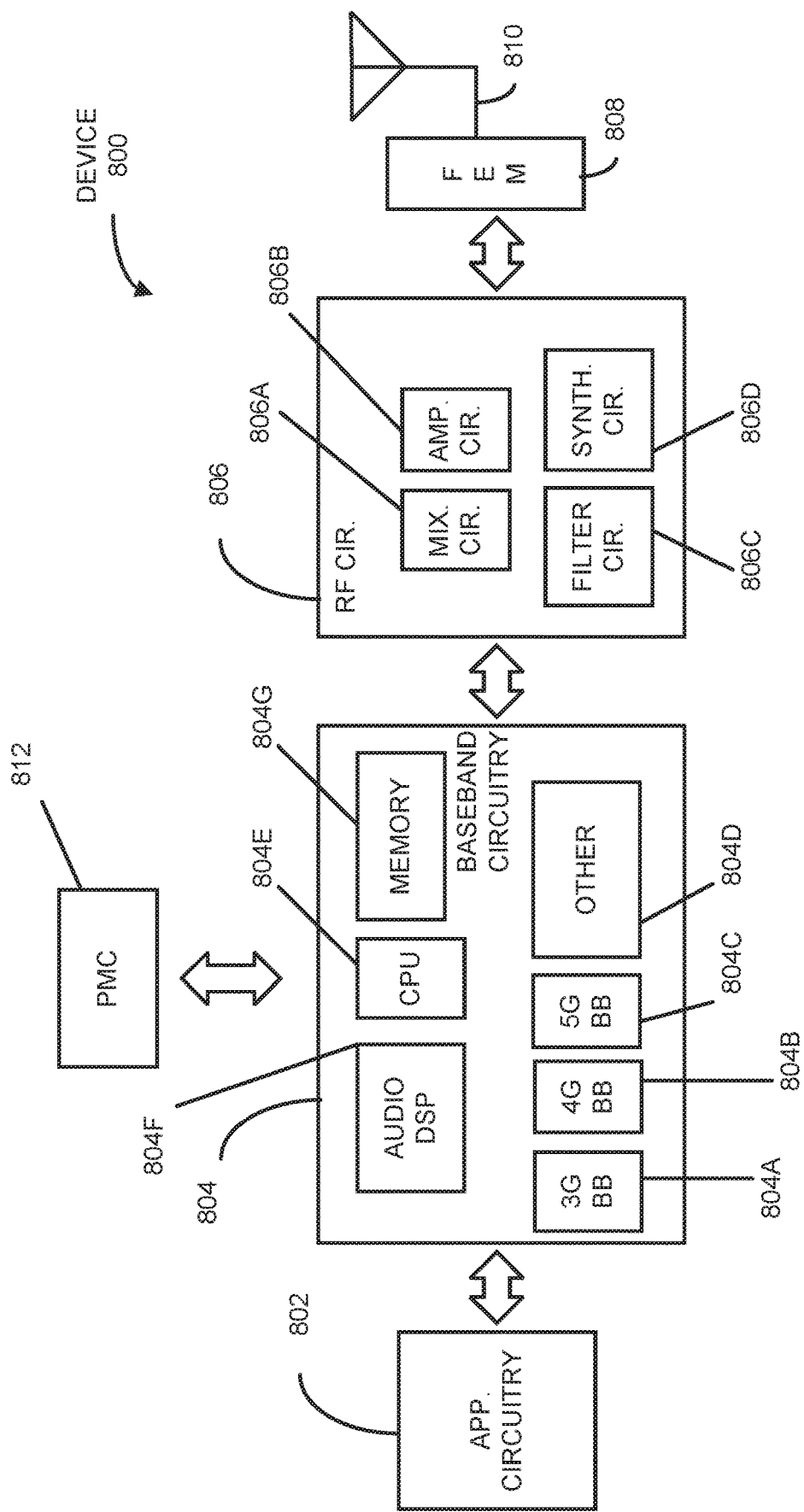
FIG. 8 illustrates aspects of a UE, a wireless apparatus, or a device, in accordance with some example embodiments.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include fewer elements (e.g., a RAN node may not utilize the application circuitry 802, and instead include a processor/controller to process IP data received from an EPC). In some embodiments, the device 800 may include additional elements such as, for example, memory/storage, a display, a camera, a sensor, or an input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of the application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. The baseband circuitry 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development, or generations to be developed in the future (e.g., second generation (2G), sixth generation (6G), etc.). The baseband circuitry 804 (e.g., one or more of the baseband processors 804A-D) may handle various radio control functions that enable communication with one or more radio networks via the RF circuitry 806. In other embodiments, some or all of the functionality of the baseband processors 804A-D may be included in modules stored in a memory 804G and executed via a Central Processing Unit (CPU) 804E. The radio control functions may include, but are not limited to, signal modulation/demodulation, encoding/decoding, radio frequency shifting, etc. In sonic embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be or include elements for compression/decompression and echo cancellation, and may include other suitable processing elements in other embodiments. Components of the baseband circuitry 804 may be suitably combined in a single chip or a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMANs), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. The RF circuitry 806 may include a receive signal path which may include circuitry to down-convert RF signals received from the FEM circuitry 808 and provide baseband signals to the baseband circuitry 804. The RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b, and filter circuitry 806c. In some embodiments, the transmit signal path of the RF circuitry 806 may include the filter circuitry 806c and the mixer circuitry 806a. The RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by the synthesizer circuitry 806d. The amplifier circuitry 806b may be configured to amplify the down-converted signals, and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by the filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In these alternative embodiments, the RF circuitry 806 may include analog-to-digital converter (ADC) and digital-to-analog converter (DAC) circuitry, and the baseband circuitry 804 may include a digital baseband interface to communicate with the RF circuitry 806.

In some dual-mode embodiments, separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect, as other types of frequency synthesizers may be suitable. For example, the synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage-controlled oscillator (VCO), although that is not a requirement. Divider control input may be provided by either the baseband circuitry 804 or the application circuitry 802 depending on the desired output frequency. In some embodiments, a divider control input (e.g., N) may be determined from a look-up table based on a channel indicated by the application circuitry 802.

The synthesizer circuitry 806d of the RF circuitry 806 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable delay elements, a phase detector, a charge pump, and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In sonic embodiments, the output frequency may be a LO frequency (e.g., fLO). In some embodiments, the RF circuitry 806 may include an IQ/polar converter.

The FEM circuitry 808 may include a receive signal path which may include circuitry configured to operate on RF signals received from the one or more antennas 810, amplify the received signals, and provide the amplified versions of the received signals to the RF circuitry 806 for further processing. The FEM circuitry 808 may also include a transmit signal path which may include circuitry configured to amplify signals provided by the RF circuitry 806 for transmission by one or more of the one or more antennas 810. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by the RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device 800 is included in a UE. The PMC 812 may increase the power conversion efficiency while providing desirable implementation size and heat dissipation characteristics.

FIG. 8 shows the PMC 812 coupled only with the baseband circuitry 804. However, in other embodiments, the PMC 812 may be additionally or alternatively coupled with, and perform similar power management operations for, other components, such as, but not limited to, the application circuitry 802, RF circuitry 806, or FEM circuitry 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low-power state and it performs paging where it periodically wakes up to listen to the network and then powers down again. The device 800 may not receive data in this state in order to receive data, it transitions back to the RRC_Connected state.

An additional power-saving mode may allow the device 800 to be unavailable to the network for periods longer than a paging interval (ranging from seconds to a few hours). During this time, the device 800 is totally unreachable to the network and may power down completely. Any data sent during this time incurs a large delay, and it is assumed that the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
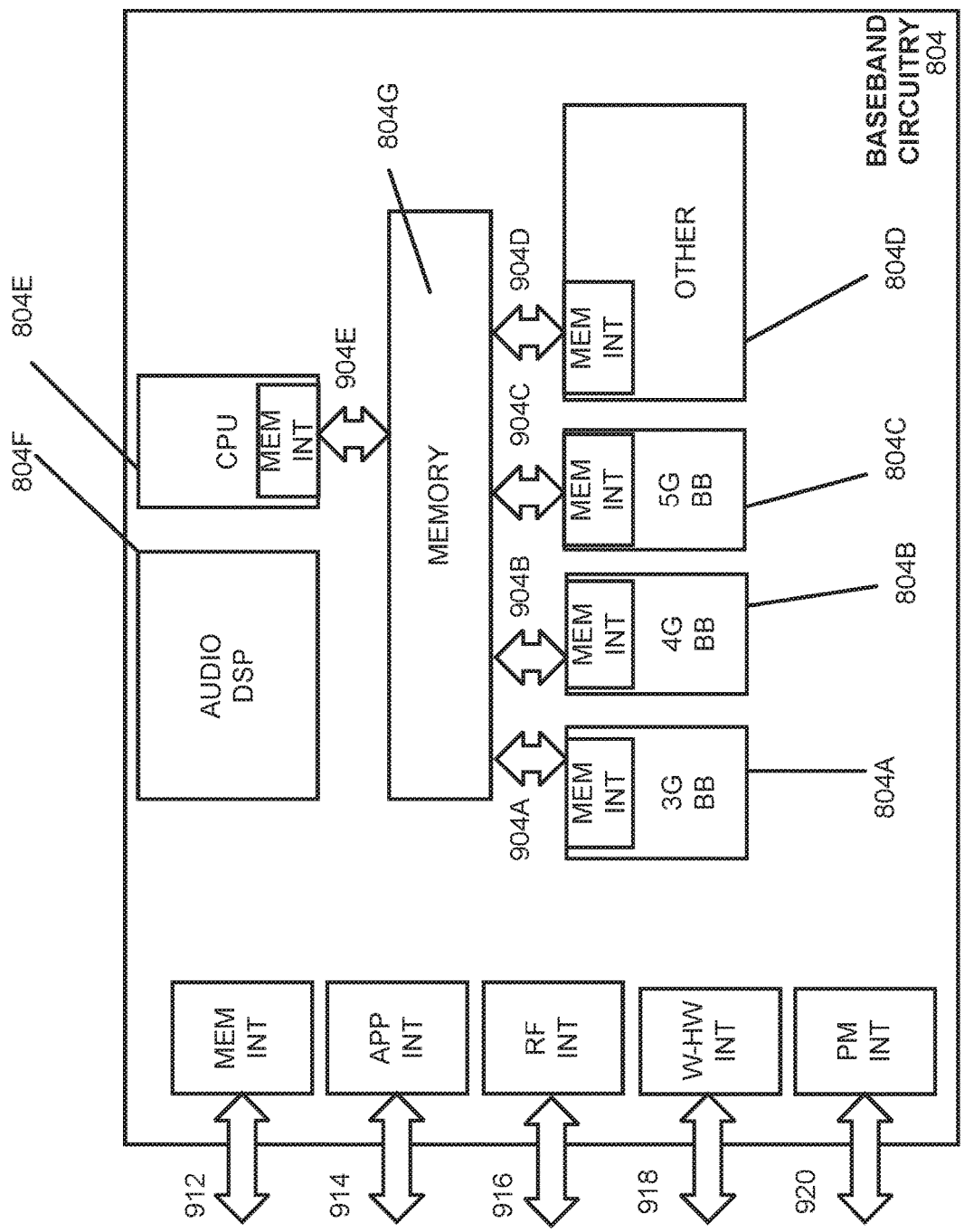
FIG. 9 illustrates example interfaces of baseband circuitry in accordance with some embodiments.

FIG. 9 illustrates example interfaces of the baseband circuitry 804 in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from the RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812).

Figure 10:
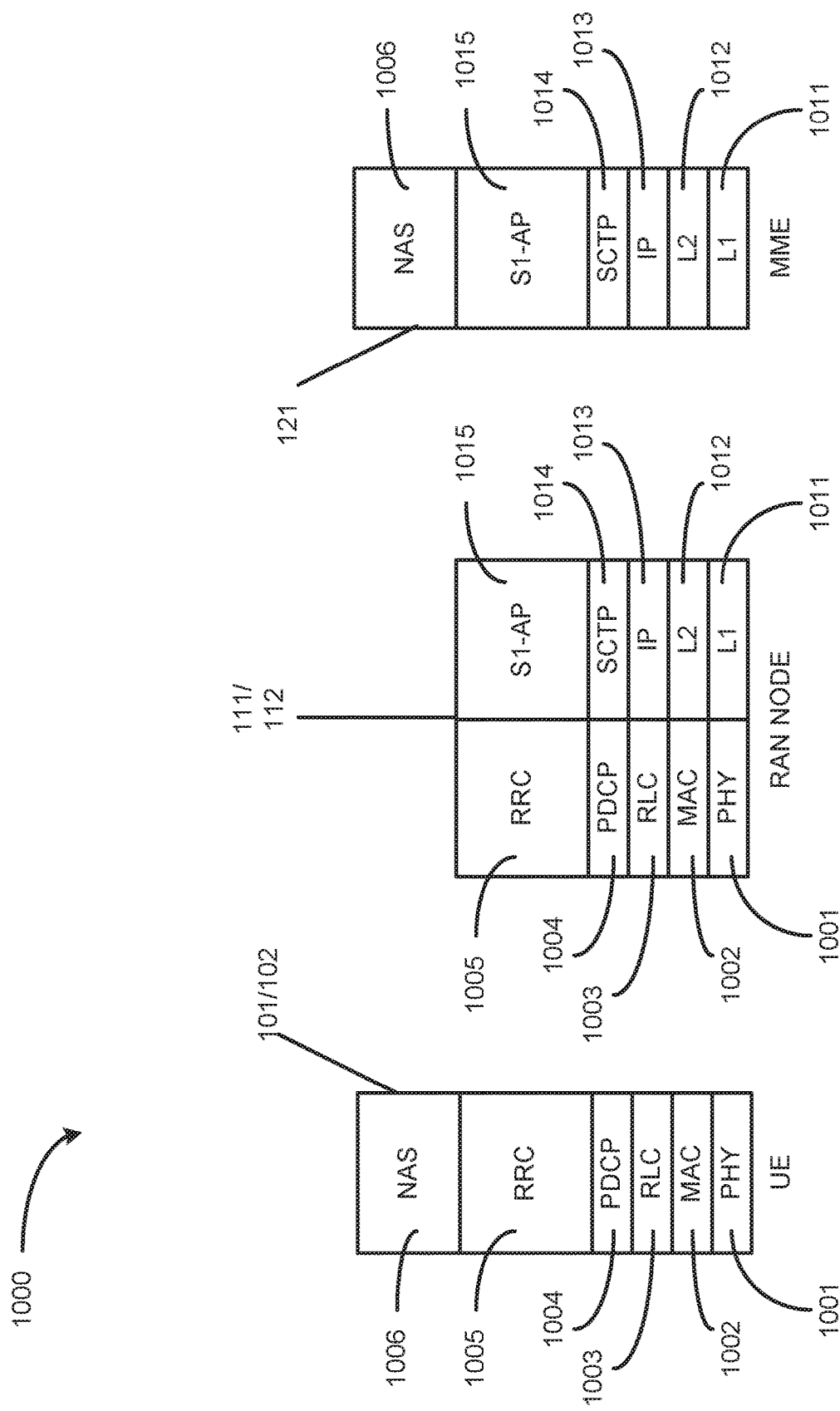
FIG. 10 is an illustration of a control-plane protocol stack in accordance with some embodiments.

FIG. 10 is an illustration of a control-plane protocol stack in accordance with some embodiments. In this embodiment, a control plane 1000 is shown as a communications protocol stack between the UE 101 (or alternatively, the UE 102), the macro RAN node 111 (or alternatively, the LP RAN node 112), and the MME 121.

A PHY layer 1001 may transmit or receive information used by a MAC layer 1002 over one or more air interfaces. The PHY layer 1001 may further perform link adaptation or adaptive modulation and coding (AMC), power control, cell search (e.g., for initial synchronization and handover purposes), and other measurements used by higher layers, such as an RRC layer 1005. The PHY layer 1001 may still further perform error detection on the transport channels, forward error correction (FEC) coding/decoding of the transport channels, modulation/demodulation of physical channels, interleaving, rate matching, mapping onto physical channels, and Multiple-Input Multiple-Output (MIMO) antenna processing.

The MAC layer 1002 may perform mapping between logical channels and transport channels, multiplexing of MAC service data units (SDUs) from one or more logical channels onto transport blocks (TB) to be delivered to the PHY layer 1001 via transport channels, de-multiplexing of MAC SDUs to one or more logical channels from transport blocks (TB) delivered from the PHY layer 1001 via transport channels, multiplexing of MAC SDUs onto TBs, scheduling information reporting, error correction through hybrid automatic repeat request (HARQ), and logical channel prioritization.

An RLC layer 1003 may operate in a plurality of modes of operation, including Transparent Mode (TM), Unacknowledged Mode (UM), and Acknowledged Mode (AM). The RLC layer 1003 may execute transfer of upper-layer protocol data units (PDUs), error correction through automatic repeat request (ARQ) for AM data transfers, and concatenation, segmentation, and reassembly of RLC SDUs for UM and AM data transfers. The RLC layer 1003 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 1004 may execute header compression and decompression of IP data, maintain PDCP Sequence Numbers (SNs), perform in-sequence delivery of upper-layer PDUs at the re-establishment of lower layers, eliminate duplicates of lower-layer SDUs at the re-establishment of lower layers for radio bearers mapped on RLC AM, cipher and decipher control-plane data, perform integrity protection and integrity verification of control-plane data, control timer-based discard of data, and perform security operations (e.g., ciphering, deciphering, integrity protection, integrity verification, etc.).

The main services and functions of the RRC layer 1005 may include broadcast of system information (e.g., included in Master Information Blocks (MIBs) or System Information Blocks (SIBs)) related to the non-access stratum (NAS); broadcast of system information related to the access stratum (AS); paging, establishment, maintenance, and release of an RRC connection between the UE and E-UTRAN (e.g., RRC connection paging, RRC connection establishment, RRC connection modification, and RRC connection release); establishment, configuration, maintenance, and release of point-to-point Radio Bearers; security functions including key management; inter-radio access technology (RAT) mobility; and measurement configuration for UE measurement reporting. Said MIBs and SIBS may comprise one or more information elements (IEs), which may each comprise individual data fields or data structures.

The UE 101 and the macro RAN node 111 may utilize a Uu interface (e.g., an LTE-Uu interface) to exchange control-plane data via a protocol stack comprising the PHY layer 1001, the MAC layer 1002, the RLC layer 1003, the PDCP layer 1004, and the RRC layer 1005.

Non-access stratum (NAS) protocols 1006 form the highest stratum of the control plane 1000 between the UE 101 and the MME 121. The NAS protocols 1006 support the mobility of the UE 101 and the session management procedures to establish and maintain IP connectivity between the UE 101 and the P-GW 123.

An S1 Application Protocol (S1-AP) layer 1015 may support the functions of the S1 interface and comprise Elementary Procedures (EPs). An EP is a unit of interaction between the macro RAN node 111 and the CN 120. The S1-AP layer 1015 services may comprise two groups: UE-associated services and non-UE-associated services. These services perform functions including, but not limited to, E-UTRAN Radio Access Bearer (E-RAB) management, UE capability indication, mobility, NAS signaling transport, RAN information Management (RIM), and configuration transfer.

A Stream Control Transmission Protocol (SCTP) layer (alternatively referred to as an SCT/IP layer) 1014 may ensure reliable delivery of signaling messages between the macro RAN node 111 and the MME 121 based, in part, on the IP protocol, supported by an IP layer 1013. An L2 layer 1012 and an L1 layer 1011 may refer to communication links (e.g., wired or wireless) used by the macro RAN node 111 and the MME 121 to exchange information.

The macro RAN node 111 and the MME 121 may utilize an S1-MME interface to exchange control-plane data via a protocol stack comprising the L1 layer 1011, the L2 layer 1012, the IP layer 1013, the SCTP layer 1014, and the S1-AP layer 1015.

Figure 11:
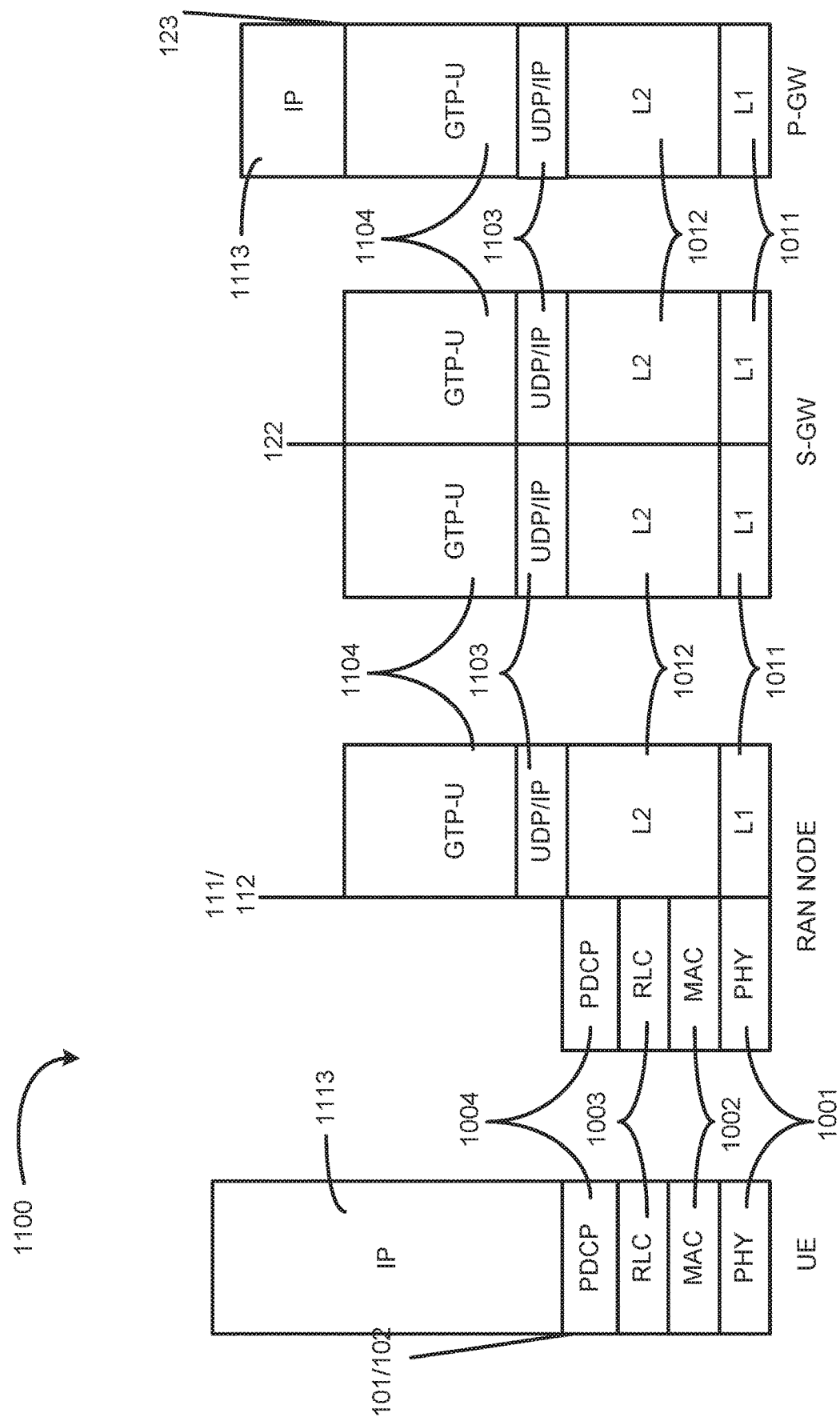
FIG. 11 is an illustration of a user-plane protocol stack in accordance with some embodiments.

FIG. 11 is an illustration of a user-plane protocol stack in accordance with some embodiments. In this embodiment, a user plane 1100 is shown as a communications protocol stack between the UE 101 (or alternatively, the UE 102), the macro RAN node 111 (or alternatively, the LP RAN node 112), the S-GW 122, and the P-GW 123. The user plane 1100 may utilize at least some of the same protocol layers as the control plane 1000. For example, the UE 101 and the macro RAN node 111 may utilize a Uu interface (e.g., an LTE-Uu interface) to exchange user-plane data via a protocol stack comprising the PHY layer 1001, the MAC layer 1002, the RLC layer 1003, and the PDCP layer 1004.

A General Packet Radio Service (GPRS) Tunneling Protocol for the user plane (GTP-U) layer 1104 may be used for carrying user data within the GPRS core network and between the radio access network and the core network. The user data transported can be packets in any of IPv4, IPv6, or PPP formats, for example. A UDP and IP security (UDP/IP) layer 1103 may provide checksums for data integrity, port numbers for addressing different functions at the source and destination, and encryption and authentication of the selected data flows. The macro RAN node 111 and the S-GW 122 may utilize an S1-U interface to exchange user-plane data via a protocol stack comprising the L1 layer 1011, the L2 layer 1012, the UDP/IP layer 1103, and the GTP-U layer 1104. The S-GW 122 and the P-GW 123 may utilize an S5/S8a interface to exchange user-plane data via a protocol stack comprising the L1 layer 1011, the L2 layer 1012, the UDP/IP layer 1103, and the GTP-U layer 1104. As discussed above with respect to FIG. 10, NAS protocols support the mobility of the UE 101 and the session management procedures to establish and maintain IP connectivity between the UE 101 and the P-GW 123.

Figure 12:
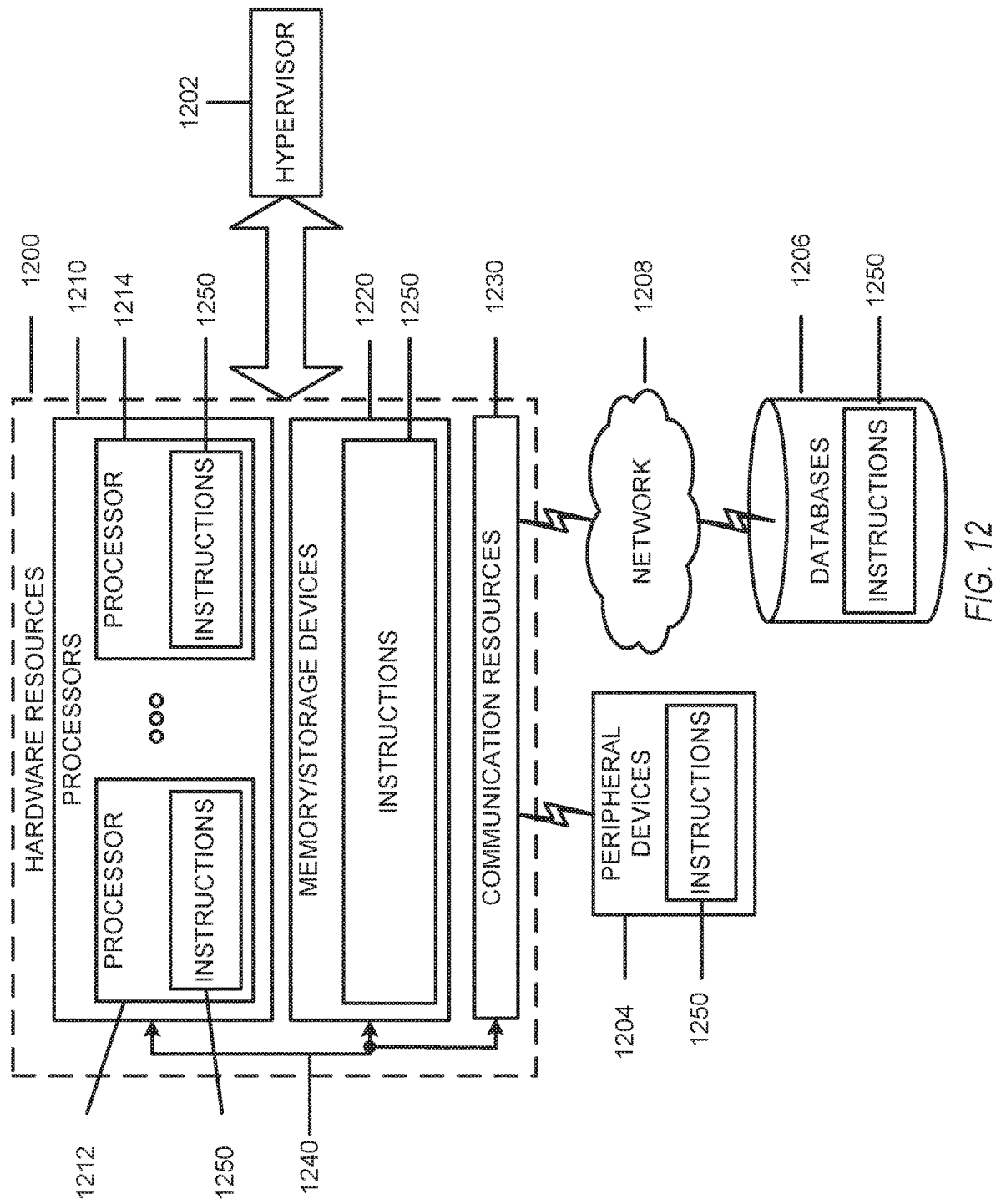
FIG. 12 is a block diagram illustrating components, according to some example embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application-specific integrated circuit (ASIC), a radio-frequency integrated circuit (RFIC), another processor, or any suitable combination thereof) may include, for example, a processor 1212, and a processor 1214.

The memory/storage devices 1220 may include main memory, disk storage, or any suitable combination thereof. The memory/storage devices 1220 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), within the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of the processors 1210, the memory/storage devices 1220, the peripheral devices 1204, and the databases 1206 are examples of computer-readable and machine-readable media.

Figure 13:
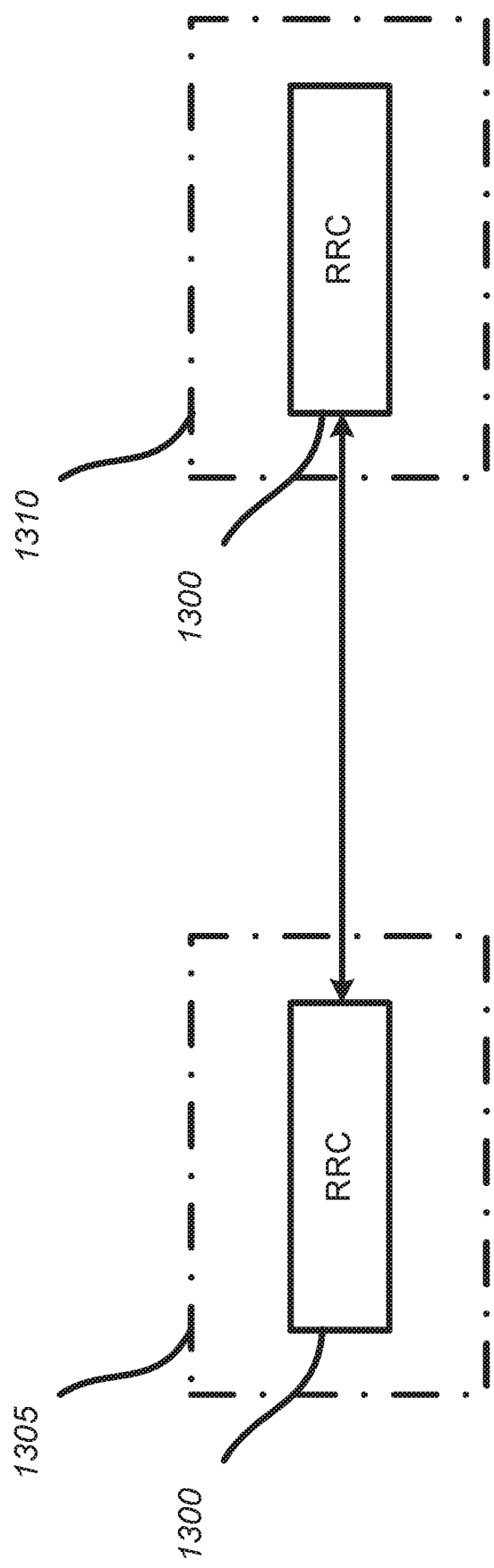
FIG. 13 illustrates aspects of communications between instances of radio resource control (RRC) layers in accordance with some embodiments.

Aspects of communication between instances of a radio resource control (RRC) layer 1300 are illustrated in FIG. 13. According to an aspect, an instance of the RRC 1300 contained in a user equipment (UE) 1305 may encode and decode messages, respectively transmitted to and received from a peer RRC instance 1300 contained in a base station 1310, which may be an evolved node B (eNodeB), gNodeB, or other base station instance.

According to an aspect, an RRC 1300 instance may encode or decode broadcast messages, which may include one or more of system information, cell selection and reselection parameters, neighboring cell information, common channel configuration parameters, and other broadcast management information.

According to an aspect, an RRC 1300 instance may encode or decode RRC connection control messages, which may include one or more of paging information; messages to establish, modify, suspend, resume, or release RRC connections; messages to assign or modify a UE identity, which may include a cell radio network temporary identifier (C-RNTI); messages to establish, modify, or release a signaling radio bearer (SRB), data radio bearer (DRB), or QoS flow; messages to establish, modify, or release security associations including integrity protection and ciphering information; messages to control inter-frequency, intra-frequency, and inter-radio access technology (RAT) handover; messages to recover from radio link failure; messages to configure and report measurement information; and messages to perform other management control and information functions.

Figure 14:
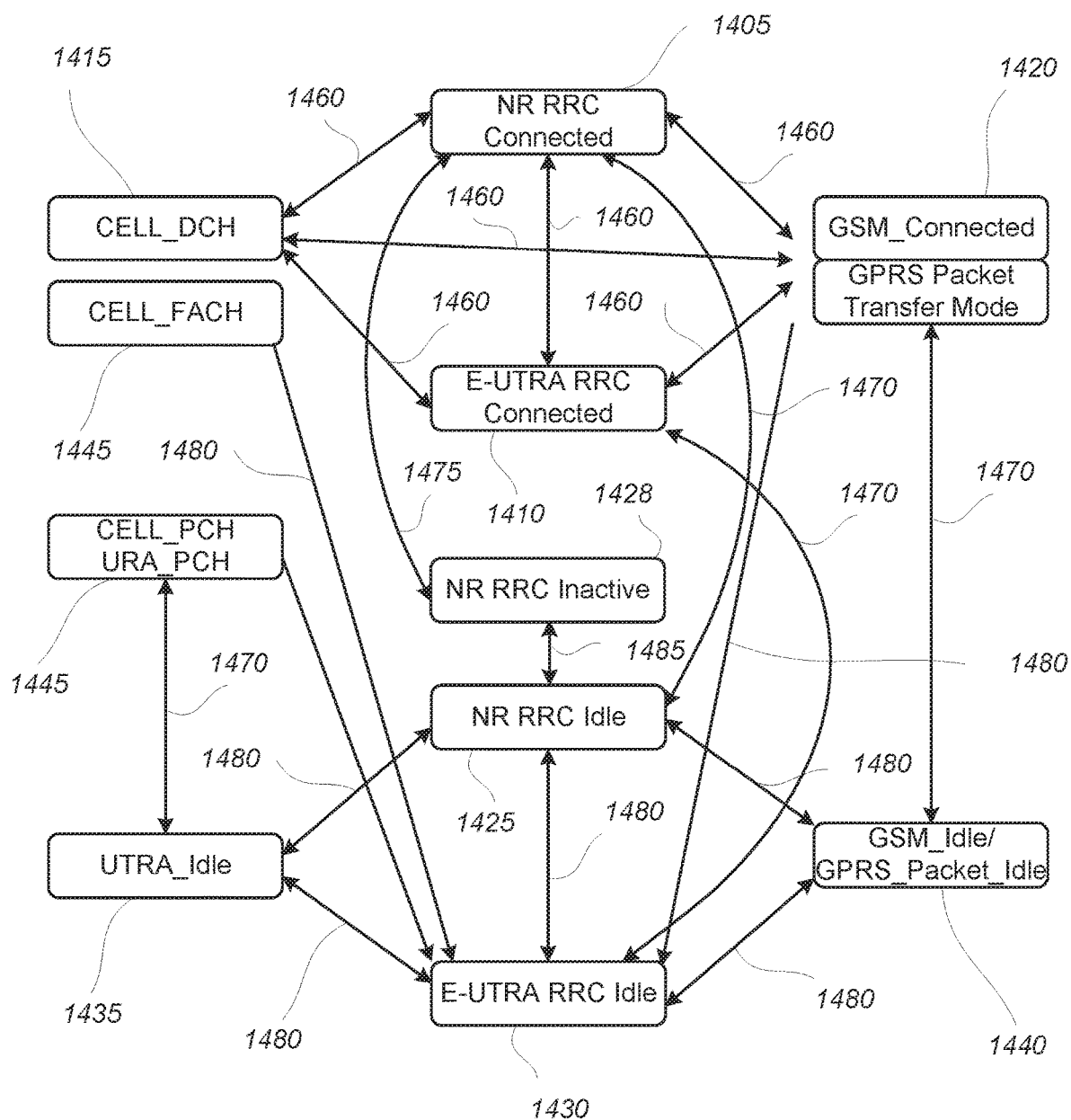
FIG. 14 illustrates states of an RRC layer that may be implemented in a UE in accordance with some embodiments.

States of an RRC 1300 that may be implemented in a user equipment (UE) in some aspects are illustrated in FIG. 14.

According to some aspects, an RRC entity 1300 may be in one of states NR RRC Connected 1405, NR RRC Inactive 1428, or NR RRC Idle 1425 when connected to or camped on a cell belonging to a 5G new radio (NR) network.

According to some aspects, an RRC entity 1300 may be in one of states E-UTRA RRC Connected 1410 or E-UTRA RRC Idle 1430 when connected to or camped on a cell belonging to a long term evolution (LTE) network.

According to some aspects, an RRC entity 1300 may be in one of states CELL_DCH 1415, CELL_FACH 1445, CELL_PCH/URA_PCH 1445, or UTRA_Idle 1435 when connected to or camped on a cell belonging to a universal mobile telecommunication system (UMTS) network.

According to some aspects, an RRC entity 1300 may be in one of states GSM_Connected/GPRS_Packet_Transfer_Mode 1420 or GSM_Idle/GPRS_Packet_Idle 1440 when connected to or camped on a cell belonging to a global system for mobile telecommunication (GSM) network.

According to some aspects, an RRC entity 1300 may transition from one of the states in the set consisting of NR RRC Connected 1405, E-UTRA RRC Connected 1410, CELL_DCH 1415, CELL_FACH 1445, and GSM_Connected/GPRS_Packet_Transfer_Mode 1420, which may be termed connected states, to another state in the same set via a handover transition 1460.

According to some aspects, an RRC entity 1300 may transition from one of the states in the set consisting of NR RRC Idle 1425, E-UTRA RRC Idle 1430, UTRA_Idle 1435, and GSM_Idle/GPRS_Packet_Idle 1440, which may be termed idle states, to another state in the same set via a cell reselection transition 1480.

According to some aspects, an RRC entity 1300 may transition between states NR RRC Connected 1405 and NR RRC Idle 1425, via an RRC connect/disconnect transition 1470. According to some aspects, an RRC entity 1300 may transition between states E-UTRA RRC Connected 1410 and E-UTRA RRC Idle 1430, via an RRC connect/disconnect transition 1470. According to some aspects, an RRC entity 1300 may transition between states CELL_PCH/URA_PCH 1445 and UTRA_Idle 1435, via an RRC connect/disconnect transition 1470. According to sonic aspects, an RRC entity 1300 may transition between states GSM_Connected/GPRS_Packet_Transfer_Mode 1420 and GSM_Idle/GPRS_Packet_Idle 1440, via an RRC connect/disconnect transition 1470.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

While as described herein, non-transitory computer readable media or a device-readable medium may be discussed as a single medium, the term "communication device-readable medium" may include a single medium or multiple media (e.g., a centralized or distributed database, and/or associated caches and servers) configured to store the one or more instructions.

The term "communication device-readable medium" may include any medium that is capable of storing, encoding, or carrying instructions for execution by a communication device and that cause the communication device to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include non-volatile memory, such as semiconductor memory devices (e.g., EPROM, Electrically Erasable Programmable Read-Only Memory (EEPROM)) and flash memory devices; magnetic disks, such as internal hard disks and removable disks; magneto-optical disks; RAM; and CD-ROM and DVD-ROM disks. In some examples, communication device-readable media may include non-transitory communication device-readable media. In some examples, communication device-readable media may include communication device-readable media that is not a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), HTTP, etc.). Example communications networks may include a local area network (LAN), a wide area network (WAN), a packet data network (e.g., the Internet), mobile telephone networks (e.g., cellular networks), Plain Old Telephone Service (POTS) networks, wireless data networks (e.g., IEEE 1002.11 family of standards known as Wi-Fi®, IEEE 1002.16 family of standards known as WiMAX®), IEEE 1002.15.4 family of standards, an LTE family of standards, a Universal Mobile Telecommunications System (UMTS) family of standards, or peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using single-input multiple-output (SIMO), MIMO, or multiple-input single-output (MISO) techniques. In some examples, the network interface device may wirelessly communicate using Multiple-User MIMO techniques. The term "transmission medium" shall be taken to include any intangible medium that is capable of storing, encoding, or carrying instructions for execution by the communication device, and includes digital or analog communications signals or other intangible media to facilitate communication of such software.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), RAM, magnetic disk storage media, optical storage media, flash-memory devices, and other storage devices and media. Some embodiments may include one or more processors and may be configured with instructions stored on a computer-readable storage device.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, UE, article, composition, formulation, or process that includes elements in addition to those listed after such a term in a claim is still deemed to fall within the scope of that claim. Moreover, in the following claims, the terms "first," "second," "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   at an apparatus:
      receiving, from a base station (BS), a configuration communication in a handover command as part of a handover procedure to a target BS, wherein the configuration communication comprises a first random access channel (RACH) configuration and a second RACH configuration, and wherein the first RACH configuration comprises a plurality of dedicated random access parameters;
      performing a RACH procedure with the target BS using two or more dedicated random access parameters of the plurality of dedicated random access parameters, wherein the plurality of dedicated random access parameters include an indication of a set of beams of a plurality of transmit beams at the target BS associated with respective potential RACH transmissions;

wherein respective time RACH resource information and respective frequency RACH resource information are configured separately for the first RACH configuration and the second RACH configuration.

2. The method of claim 1, wherein the configuration communication comprises an RRCConnectionReconfiguration communication.

3. The method of claim 2, wherein the RRCConnectionReconfiguration communication is received at the apparatus as part of an information element indicating a handover operation using the plurality of dedicated random access parameters.

4. The method of claim 3, wherein the performing of the RACH procedure comprises setup of the handover operation using the plurality of dedicated random access parameters from the first RACH configuration.

5. The method of claim 4, wherein the plurality of dedicated random access parameters comprises at least a PreambleIndex parameter and a timing resource parameter.

6. The method of claim 5, wherein the timing resource parameter indicates reuse of a T304 timer.

7. The method of claim 5, further comprising:
performing the RACH procedure until a timer associated with the timing resource parameter expires; and perform a fallback RACH procedure after the timer expires.

8. The method of claim 5, wherein the plurality of dedicated random access parameters further comprises a frequency resource parameter.

9. The method of claim 5, wherein the information element indicating the handover operation comprises a MobilityInfo or a MobilityControlInfo information element.

10. The method of claim 5, further comprising:
determining that the RRCConnectionReconfiguration communication does not include a dedicated preamble indication; and selecting, in response to the determination that the RRCConnectionReconfiguration communication does not include the dedicated preamble indication, a preamble code randomly from among a set of candidate preamble codes from an earliest candidate time and frequency RACH resource configured in the plurality of dedicated random access parameters.

11. The method of claim 8, wherein the RACH procedure is allocated to repeat periodically with respect to a set of subframes until a handover operation is complete when the apparatus does not know a target system frame number (SFN).

12. The of claim 1. wherein an end to the RACH procedure is indicated by the base station in terms of a source cell system frame number (SFN).

13. The method of claim 1, wherein the configuration communication comprises a Physical Downlink Control Channel (PDCCH) communication, and wherein the method further comprises monitoring a PDCCH for the configuration communication.

14. The method of claim 1, wherein the apparatus comprises radio frequency circuitry coupled to at least one processor; and one or more antennas coupled to the radio frequency circuitry and configured to receive the configuration communication from the base station.

15. The method of claim 14, further comprising: receiving: a plurality of network beams; determining that a first network beam of the plurality of network beams has a highest measured signal; initiating an indication associated with the first network beam to the base station, wherein the configuration communication is received via the first network beam until the apparatus receives a random access response (BAR) message, and wherein the at least one processor is a baseband processor.

16. The apparatus of claim 1, wherein the first RACH configuration indicates a number of beams per time and frequency resources.

17. A non-transitory machine-readable storage medium storing program instructions executable by one or more processors of a user equipment (UE) to cause the UE to.
receive, from a base station (BS), a configuration communication in a handover command as part of a handover procedure to a target cell, wherein the configuration communication comprises a first random access channel (RACH) configuration and a second RACH configuration, and wherein the first RACH configuration comprises a plurality of dedicated random access parameters;

perform a RACH procedure with the target cell using two or more dedicated random access parameters of the plurality of dedicated random access parameters, wherein the plurality of dedicated random access parameters include an indication of a set of beams of a plurality of transmit beams at the target cell associated with respective potential RACH transmissions;

wherein respective time RACH resource information and respective frequency RACH resource information are configured separately for the first RACH configuration and the second RACH configuration.

18. The non-transitory machine-readable storage medium of claim 17, wherein the plurality of dedicated random access parameters comprises at least a PreambleIndex parameter, a frequency resource parameter, and a timing resource parameter.

19. The non-transitory machine-readable storage medium of claim 18, wherein the timing resource parameter indicates reuse of a T304 timer.

20. The non-transitory machine-readable storage medium of claim 18, wherein the program instructions are further executable to cause the UE to:
perform the handover procedure until a timer associated with the timing resource parameter expires; and perform a fallback handover procedure after the timer expires.

21. An apparatus, comprising:
at least one processor configured to cause a base station (BS) to:
transmit, to a user equipment (UE), a configuration communication in a handover command as part of a handover procedure to a target BS, wherein the configuration communication comprises a first random access channel (RACH) configuration and a second RACH configuration, and wherein the first configuration comprises a plurality of dedicated random access parameters; and enable a RACH procedure for connection of the UE with the target BS using two or more dedicated random access parameters of the plurality of dedicated random access parameters, wherein the plurality of dedicated random access parameters include an indication of a set of beams of a plurality of transmit beams at the target BS associated with respective potential RACH transmissions;

wherein respective time RACH resource information and respective frequency RACH resource information are configured separately for the first RACH configuration and the second RACH configuration.

22. The apparatus of claim 21, wherein the configuration communication comprises an RRCConnectionReconfiguration communication; and wherein the RRCConnectionReconfiguration communication is transmitted to the UE as part of an information element indicating a handover operation using the plurality of dedicated random access parameters.

23. The apparatus of claim 22, wherein the plurality of dedicated random access parameters comprises at least a PreambleIndex parameter, a timing resource parameter, and a frequency resource parameter.

24. The apparatus of claim 21, wherein the first RACH configuration indicates a number of beams per time and frequency resources.

* * * * *